United States Patent [19]
Fukakusa

[11] Patent Number: 5,615,203
[45] Date of Patent: Mar. 25, 1997

[54] FLOATING-TYPE OPTICAL HEAD HAVING INCORPORATED THEREIN A FLOATING SLIDER AND AN OPTICAL DEVICE WHICH FLOATS WITH THE SLIDER, INCLUDES A LIGHT SOURCE, CONDENSING UNIT AND PHOTODETECTOR AND IS SUPPORTED MOVABLY RELATIVE TO THE FLOATING SLIDER

[75] Inventor: Masaharu Fukakusa, Saga-ken, Japan

[73] Assignee: Matsushita Electric Industrial Co., Ltd., Tokyo, Japan

[21] Appl. No.: 339,666

[22] Filed: Nov. 14, 1994

[30] Foreign Application Priority Data

Dec. 20, 1993 [JP] Japan .................................. 5-319660

[51] Int. Cl.$^6$ .............................. G11B 19/00; G11B 7/12
[52] U.S. Cl. ...................... 369/244; 369/44.12; 369/219; 369/112
[58] Field of Search ........................... 360/103; 369/222, 369/13, 244, 44.22, 44.12, 44.23, 103, 109, 112, 44.14, 219

[56] References Cited

U.S. PATENT DOCUMENTS

| | | | |
|---|---|---|---|
| 5,107,477 | 4/1992 | Fujita et al. | 369/44.12 |
| 5,197,050 | 3/1993 | Murakami et al. | 369/13 |
| 5,283,771 | 2/1994 | Kadowaki et al. | 369/103 |
| 5,317,556 | 5/1994 | Tsuboi et al. | 369/112 |
| 5,331,621 | 7/1994 | Miyake et al. | 369/103 |
| 5,422,870 | 6/1995 | Kojima et al. | 369/44.12 |
| 5,450,237 | 9/1995 | Yoshida et al. | 369/44.12 |
| 5,450,378 | 9/1995 | Hekker | 369/103 |
| 5,465,247 | 11/1995 | Kobayashi | 369/112 |

FOREIGN PATENT DOCUMENTS

| | | |
|---|---|---|
| 512706A | 1/1993 | Japan . |
| 554422A | 3/1993 | Japan . |

*Primary Examiner*—Robert S. Tupper
*Assistant Examiner*—Brian E. Miller
*Attorney, Agent, or Firm*—Watson Cole Stevens Davis, P.L.L.C.

[57] ABSTRACT

There is disclosed a floating-type optical head comprising a separated slider and an optical device, wherein at least either the optical device or the slider is moved thereby performing at least either tracking or focusing.

3 Claims, 19 Drawing Sheets

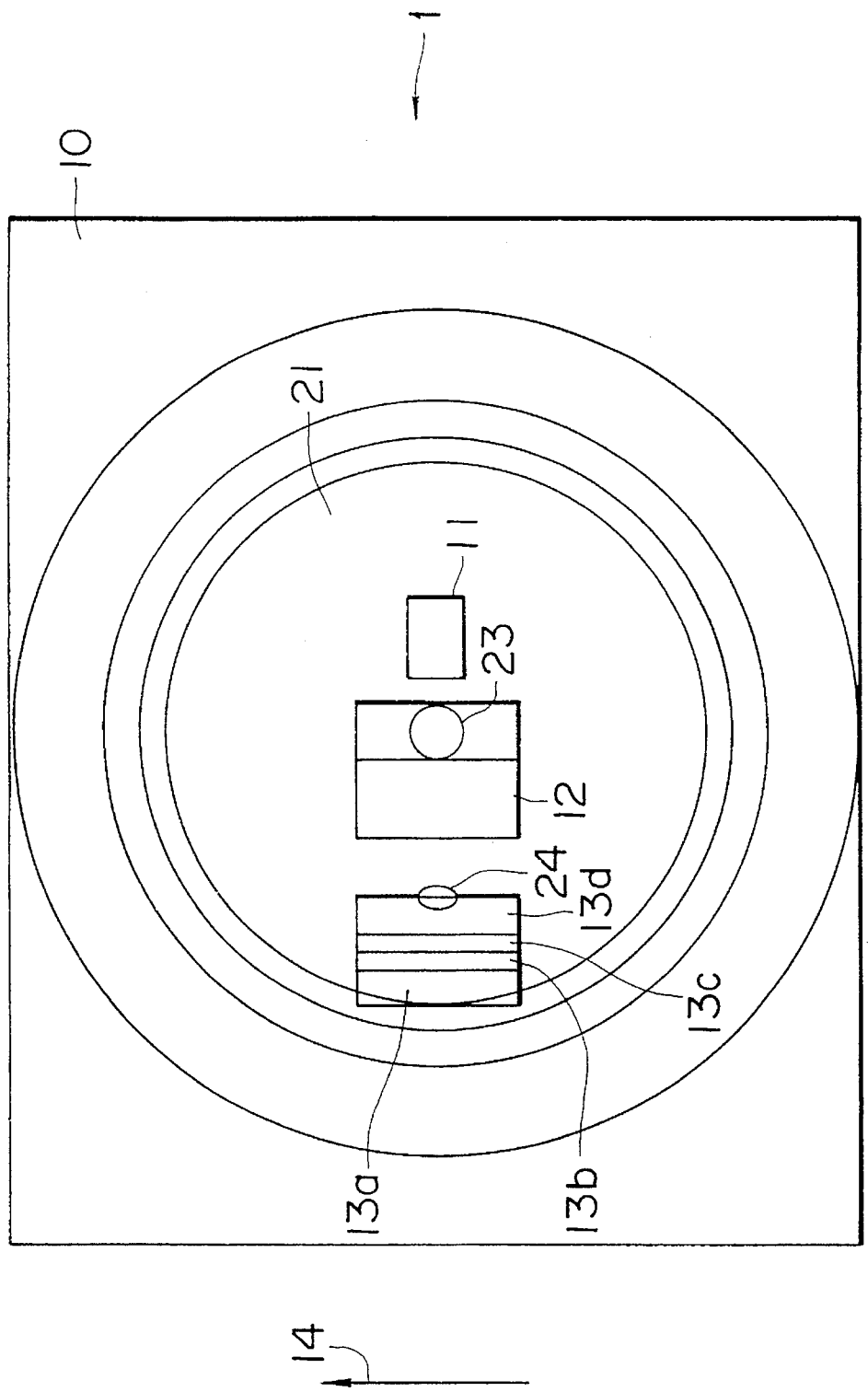

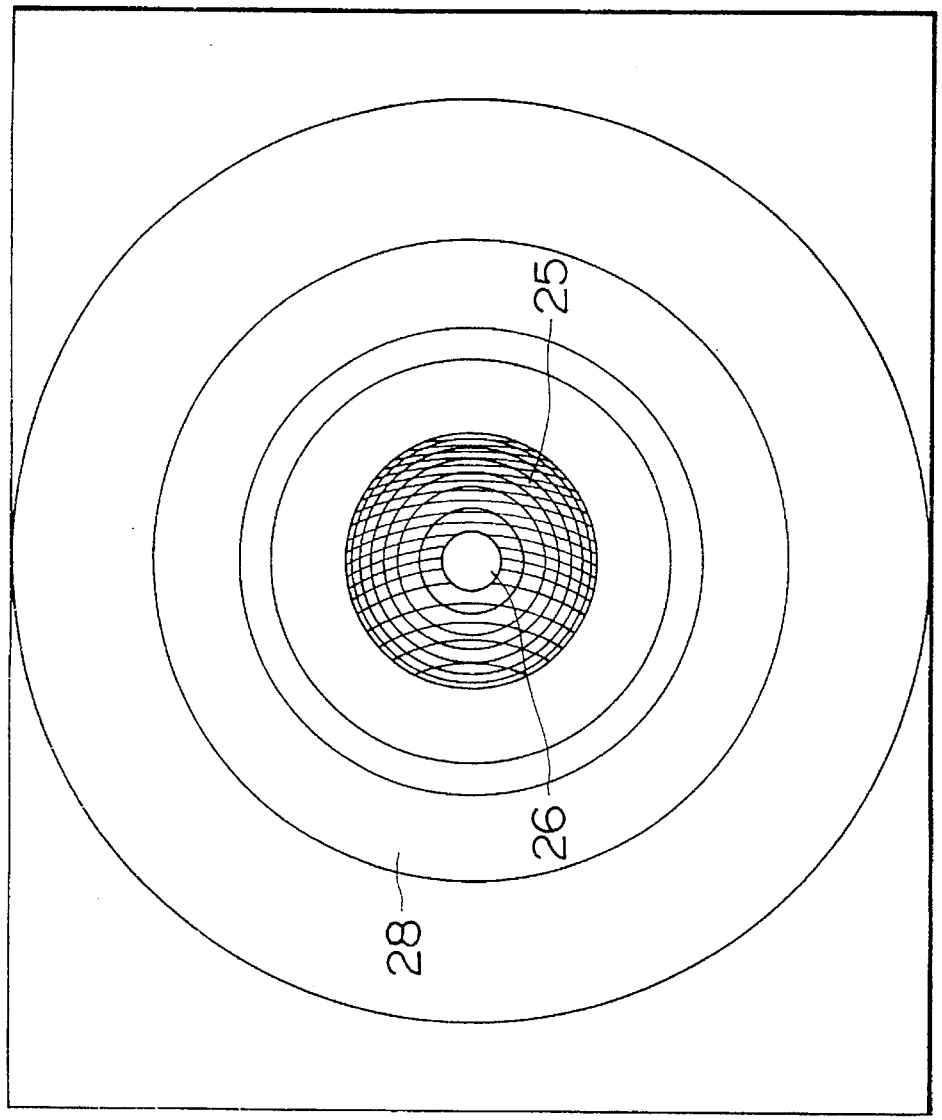

FLOATING-TYPE OPTICAL HEAD HAVING INCORPORATED THEREIN A FLOATING SLIDER AND AN OPTICAL DEVICE WHICH FLOATS WITH THE SLIDER, INCLUDES A LIGHT SOURCE, CONDENSING UNIT AND PHOTODETECTOR AND IS SUPPORTED MOVABLY RELATIVE TO THE FLOATING SLIDER

BACKGROUND OF THE INVENTION

The present invention relates to an optical head for optically recording and reproducing information on an optical recording medium, and to an optical recording and reproducing apparatus using such optical head. More specifically, the present invention relates to a floating-type optical head that runs over an optical recording medium at a small height above its surface so as to record and reproduce information, and to an optical recording and reproducing apparatus using such floating-type head.

FIG. 19 illustrates a conventional floating-type optical head.

As shown in FIG. 19, the conventional floating-type optical head has a main floating slider portion 120 for forcing the optical head to float at a predetermined height above an optical recording medium 110. This floating slider 120 is provided with a deflection mirror 122 and an objective lens 121. The floating slider 120 is supported by a supporting element 133 wherein the floating slider 120 is pressed toward the optical recording medium 110. The supporting element 133 is fixed to an arm 132 in such a manner that the supporting element 133 may move in radial directions. When the optical recording medium 110 starts rotation, the floating slider 120 goes up and floats there maintaining a certain gap relative to the surface of the optical recording medium 110. A light emitting device 128 such as a laser diode emits a light beam that travels passing through a condensing lens 126, a beam splitter 125, a polarizing plate 124, and a deflecting element 123, and is reflected by a deflection mirror 122. The reflected light beam is then focused onto the optical recording medium 110 by an objective lens 121. The light beam is reflected by the optical recording medium 110 and travels to the beam splitter 125 through the objective lens 121, the deflection mirror 122, the deflecting element 123, and the polarizing plate 124. The light beam is reflected by the beam splitter 125 and then travels passing through a condensing lens 129 and a cylindrical lens 130. Finally, the light beam reaches a photosensor 131, and thus the photosensor 131 detects a signal. The condensing lens 126 is driven by a driving element 127 in directions approximately along its optical axis so that the light beam is focused onto the surface of the optical recording medium 110. A light spot projected onto the optical recording medium is positioned at a correct position on a data track by moving the deflecting element 123 using a fine tracking driver thereby changing an optical path slightly.

However, in the above-described conventional floating-type optical head, only the deflection mirror 122 and the objective lens 121 are installed on the floating slider 120, and optical elements such as the light emitting device 128, the photo-detecting device 131, and the beam splitter 125 are isolated from the floating slider 120.

To achieve easy assembling and adjustment, it is undesirable to reduce the sizes of these optical elements. Therefore, while it is possible to obtain a higher access speed than access speeds of other conventional optical heads, it is impossible to realize an apparatus having a small size comparable to that of a magnetic recording and reproducing apparatus, and thus it is impossible to achieve a high recording density of the apparatus.

In optical heads, there are various kinds of aberrations such as aberrations due to surface irregularities, dimensional inaccuracy, or assembling inaccuracy of optical elements, aberrations of the light emitting device itself, aberrations arising from wavelength variation of a light emitting device due to temperature variation, etc. Unless the aberration is suppressed to a very small level, it is impossible to focus a light beam into a small size of spot. For the above reason, each optical element requires high accuracy. This makes it difficult to achieve lower bit cost.

To improve the recording density of the apparatus, it is also required to solve another problem relating to focus driving means and tracking-mechanism driving means.

In general, a spot of light formed by an optical head has a positioning error arising from dimensional inaccuracy of optical elements or assembling inaccuracy. Furthermore, because an optical recording medium has vibrations in the up-and-down direction during rotation, the focus driving means is required to correctly focus a light beam onto a recording surface.

In a floating-type optical head using a floating slider, the floating slider serves as the focus driving means. However, there is still a positioning error of a spot of light arising from machining inaccuracy or assembling inaccuracy. The floating height of the floating slider varies depending on the linear velocity of a medium or depending on the YAW angle (air inlet angle), and this variation causes a positioning error of the spot of light. For these reasons, a focus driving means is essential for floating-type optical heads. In the above example of the conventional technique, since the deflection mirror 122 and the objective lens 121 are fixed to the floating slider 120, if the floating height of the floating slider varies, the variation between the objective lens 121 and the optical recording medium 110 produces a positioning error of the spot of light.

In the conventional technique, the above problem is avoided by driving the condensing lens 126 in directions along the optical axis using the driving element 127 so that correct focus is maintained.

Furthermore, the data track pitch of an optical recording and reproducing apparatus is generally as small as ⅕ to ⅒ of the data track pitch of a magnetic recording and reproducing apparatus. In most optical recording and reproducing apparatus, a portable optical recording medium or a removable disk is used, and these types of optical recording media used in optical recording and reproducing apparatus have a very large amount of decentering of data tracks compared to the case of magnetic disk storages. A high control gain and a wide control range are required to accomplish high-accuracy and high-speed tracking of a spot of light on a narrow data track. For these reasons, in common optical recording and reproducing apparatus, two-step tracking control with coarse tracking means and fine tracking means is usually employed to perform correct positioning of a spot of light on a data track.

In the above example of the conventional technique, fine tracking control is accomplished by using a fine tracking mechanism to move the deflecting element 123 so as to change the optical path thereby slightly moving the spot of light.

In this technique, however, a deviation occurs between the optical axis of a light beam incident on a lens and the optical axis of the lens, and this aberration limits the minimum size of the spot of light and thus limits the maximum recording density.

As described above, the optical recording and reproducing apparatus needs focus driving means and fine tracking means, and this inevitably causes an increase in the size of the apparatus. As a result, it is difficult to improve the recording density of the apparatus. For these reasons, it is difficult to reduce the size of the optical recording and reproducing apparatus, and therefore, it cannot be installed in a small-size personal computer such as a notebook-size personal computer.

SUMMARY OF THE INVENTION

It is an object of the present invention to provide an inexpensive small-sized optical head of the floating type that has an optical head comprising a smaller number of optical elements formed in an integral fashion thereby realizing a high recording density.

It is another object of the present invention to provide a floating-type optical head that allows reductions in the sizes of focus driving means and fine tracking-mechanism driving means and that allows improvement of the access speed as well as the recording density of the apparatus. It is a further object of the present invention to provide a small-size optical recording and reproducing apparatus having such a floating-type optical head, that can be installed in a small-size portable personal computer such as a notebook-size personal computer.

BRIEF DESCRIPTION OF THE DRAWING

FIG. 2 is a top view illustrating, in a perspective fashion, the optical head forming the floating-type optical head according to the first embodiment of the present invention;

FIG. 3 is a perspective bottom view illustrating the optical head forming the floating-type optical head according to the first embodiment of the present invention;

DETAILED DESCRIPTION OF THE INVENTION

Referring to accompanying drawings, preferred embodiments of the present invention will be described below.

EMBODIMENT 1

A first embodiment of the present invention will be described referring to FIGS. 1–7.

Figure 1:
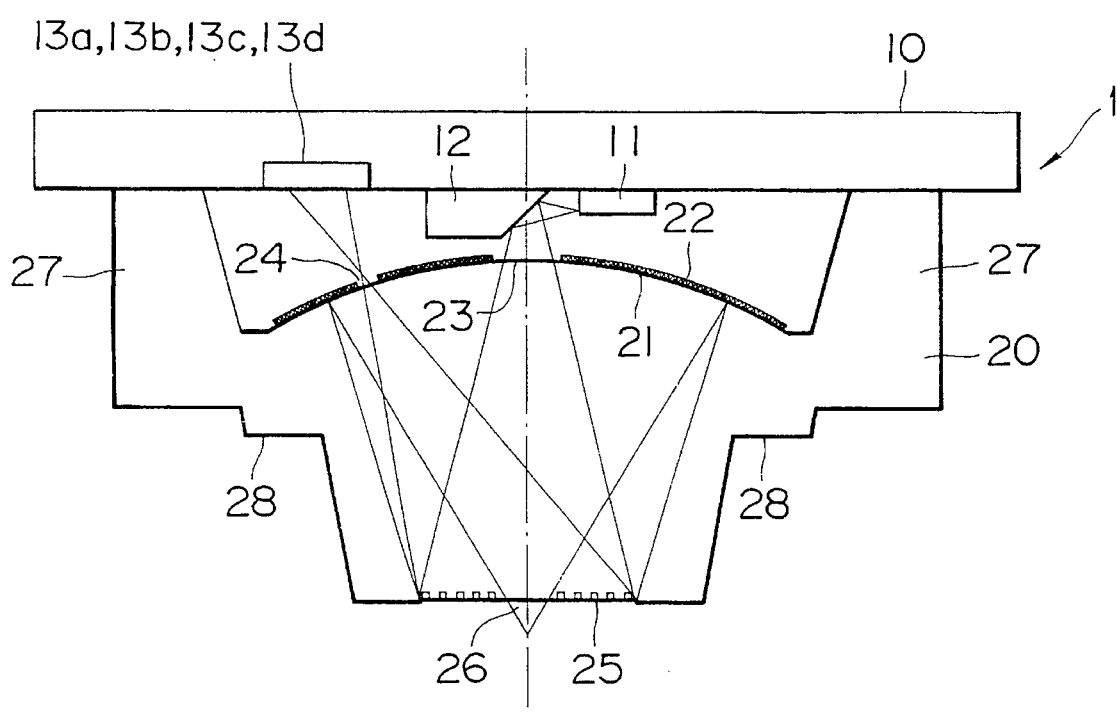
FIG. 1 is a cross-sectional view illustrating an optical head forming a floating-type optical head according to a first embodiment of the present invention, wherein the cross section is taken at its center position in the direction along a track.

First, an optical head 1 forming a floating-type optical head will be described. FIG. 1 is a cross-sectional view of the optical head 1 wherein the cross section is taken at its center position in the direction along a track. FIG. 2 is a top view illustrating, in a perspective fashion, the optical head 1. FIG. 3 is a perspective bottom view illustrating the optical head 1.

The optical head 1 comprises: a substrate 10 made of for example silicon; and an optical element 20 formed in a substantially axial-symmetric shape using a transparent optical material such as glass or plastic, wherein the back face of the optical element 20 is fixed to the substrate 10. The optical element 20 is formed in an integral fashion using a molding technique, and then a required reflective film 22 or the like is coated. A raising-up mirror 12 and a semiconductor laser serving as a light emitting device 11 are attached to the substrate 10. With this arrangement, a laser beam is emitted by the light emitting device 11, and deflected by the raising-up mirror 12 in the direction nearly perpendicular to the substrate 10. On the substrate 10, there are also provided photosensors 13a, 13b, 13c, and 13d formed by semiconductor processing wherein these four photosensors are arranged in parallel to one another in the direction along the data tracks 14.

The optical element 20 has a spheric concave lens serving as light condensing means 21, wherein the surface of the light condensing means 21 is coated with a reflective film 22. In the light condensing means 21, there is formed an inlet hole 23 for leading a laser beam emitted by the light emitting device 11 and reflected by the raising-up mirror 12, and there is also formed an outlet hole 24 for sending out the laser beam toward the photosensor 13a, 13b, 13c, 13d.

In the optical element 20, there is provided optical path correcting means 25 on the outer face of optical element 20 that is opposite to the inner face on which the light condensing means 21 is formed. The optical path correcting means 25 leads the laser beam coming through the inlet hole 23 to the light condensing means 21 and further leads the laser beam reflected by the light condensing means 21 to the photosensor 13a, 13b, 13c, and 13d. A light transmission window 26 is formed in the center of the optical path correcting means 25 so that the laser beam condensed by the light condensing means 21 passes through the light transmission window 26 toward an optical recording medium (not shown). In this first embodiment, the optical path correcting means 25 has a composite reflection-type hologram pattern that is a combination of two kinds of patterns. This composite reflection-type hologram pattern is formed when the optical element 20 is formed in an integral fashion. The reflective film 22 is coated on the surface of the reflection-type hologram pattern except for the area of the light transmission window 26.

More specifically, the hologram pattern for leading the incident light beam coming through the inlet hole 23 toward the light condensing means 21 has a form of nearly concentric circles, as shown in FIG. 3. Furthermore, its cross section has a periodic protrusion-and-recess pattern like a sawtooth shape wherein its pitch decreases with the distance measured from the center of the concentric circles toward the outer portion.

On the other hand, the hologram pattern for leading the light beam coming from the light condensing means 21 to the photosensor 13a, 13b, 13c, and 13d has a form of nearly concentric circles whose centers are deviated. The cross section of this hologram pattern also has a periodic protrusion-and-recess pattern such as a sawtooth shape. In this structure, the size (diameter) of the light transmission window 26 is smaller than the size (diameter) of the optical path correcting means 25.

If the substrate 10 and the supporting element 27 of the optical element 20 ARE bonded to each other as shown in FIG. 1, the optical head 1 is complete.

Now, a floating slider 30 that is one of the elements of the floating-type optical head of the first embodiment will be described below.

Figure 4A:
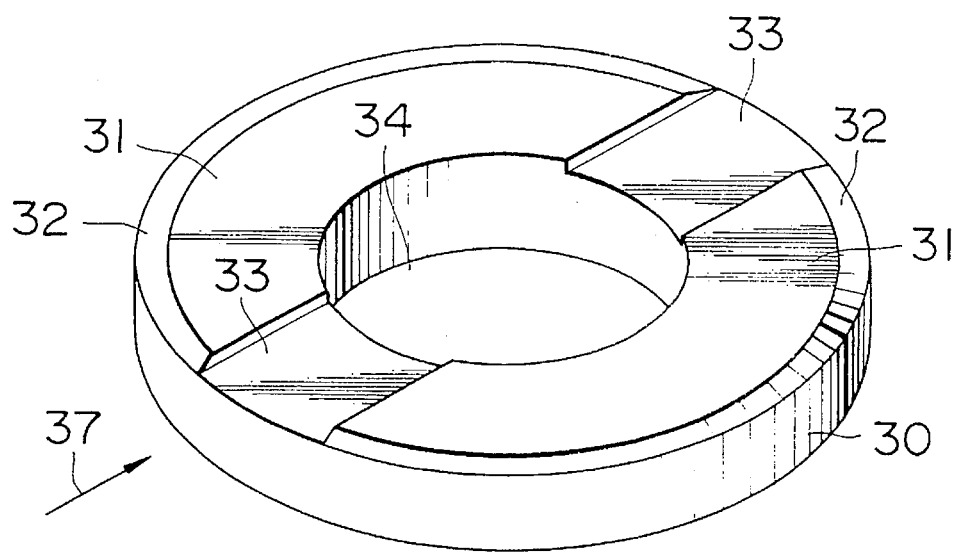
FIG. 4A is a perspective view illustrating a floating slider for use in the floating-type optical head according to the first embodiment of the present invention, wherein the floating slider is placed such that its face opposed to an optical recording medium is up.
Figure 4B:
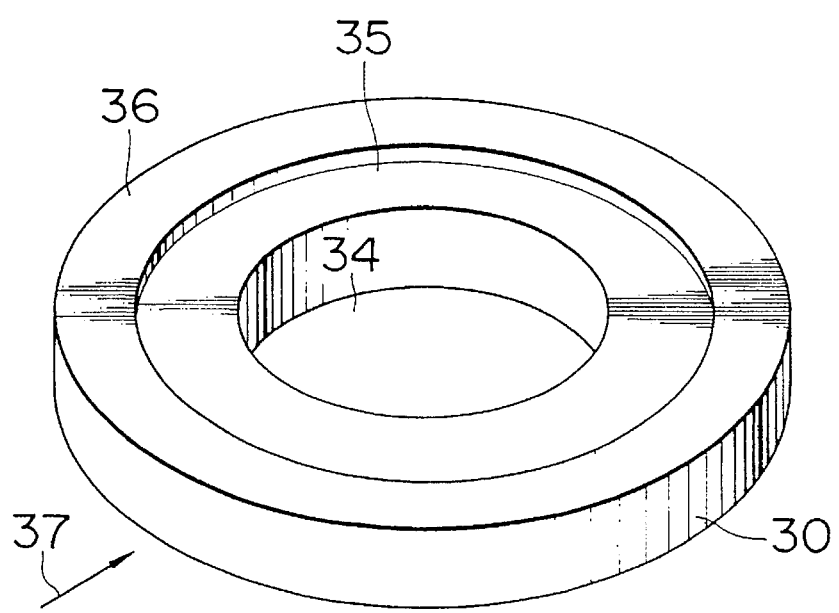
FIG. 4B is a perspective view illustrating a floating slider for use in the floating-type optical head according to the first embodiment of the present invention, wherein the floating slider is placed such that its face opposed to an optical recording medium is down.

FIGS. 4A and 4B are perspective views illustrating the floating slider 30, wherein FIG. 4A is a perspective view illustrating the floating slider 30 that is placed such that its face opposed to an optical recording medium is at the upper position, and FIG. 4B is a perspective view illustrating the floating slider 30 that is placed such that its face opposed to an optical recording medium is at the lower position. The floating slider 30 is formed of glass, a magnetic material such as ferrite, or a ceramic material using a molding technique.

The floating slider 30 has a disk-like outer shape, wherein a through-hole 34 is formed in the center of the disk. The floating slider 30 has recesses 33 and air bearing planes 31 on its face opposed to an optical recording medium, wherein inclined planes 32 having a small inclination angle are formed at edges of the air bearing planes. Air flows along the recesses 33 of the floating slider 30 in the air flowing direction 37. In the floating slider 30, a step 35 and a protrusion 36 are formed on the back face opposite to the above-described face opposed to an optical recording medium 110.

The floating slider 30 is supported by a slider holder 80 such that the floating slider 30 is pressed toward the optical recording medium 110. The rotation of the optical recording medium 110 produces a flow of air that in turn produces a positive pressure against the air bearing plane 31. This positive pressure and the weight of the supporting element balance each other, and thus the floating slider floats over the optical recording medium maintaining a constant gap between the floating slider and the surface 110 of the optical recording medium.

Figure 5:
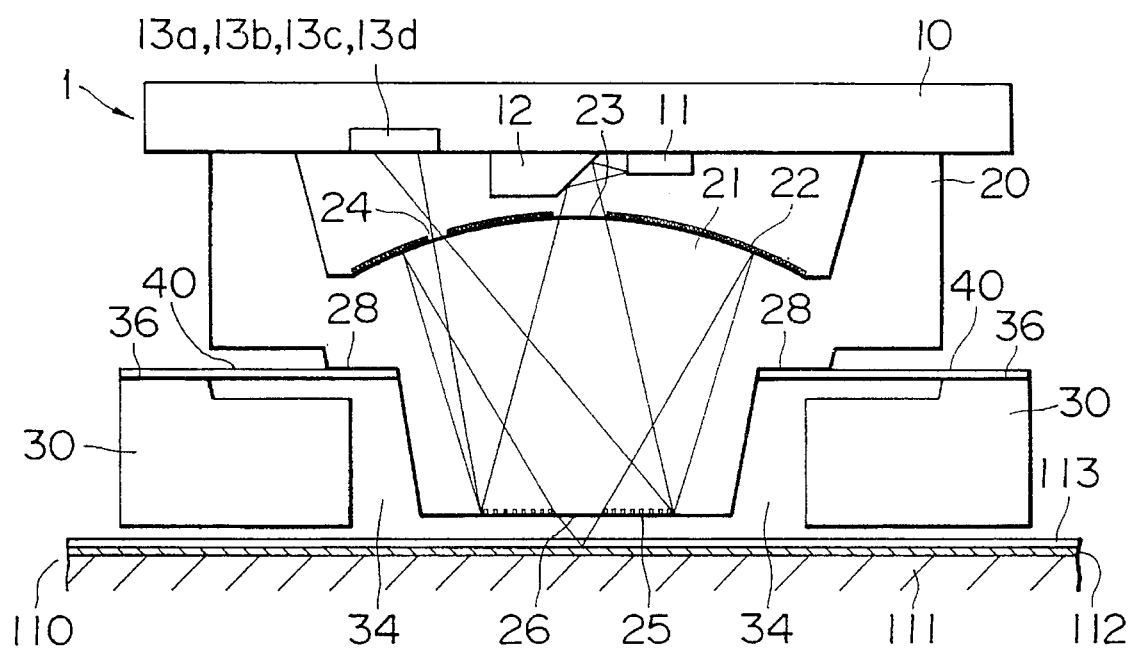
FIG. 5 is a cross-sectional view illustrating the floating-type optical head according to the first embodiment of the present invention, wherein the cross section is taken at its center position in the direction along a track.

Now, the floating-type optical head constructed with the optical head 1 and the floating slider 30 will be described referring to FIG. 5. FIG. 5 is a cross-sectional view of the floating-type optical head wherein the cross section is taken in the direction along a track at its center portion. As described above, the floating slider 30 has a structure that allows it to float over an optical recording medium 110 maintaining a small gap between the floating slider 30 and the optical recording medium 110 during the rotation of the optical recording medium 110. The optical recording medium 110 comprises: a disk substrate 111 made of for example plastic; a recording film 112 that is formed on the surface of the disk substrate 111 using a sputtering technique or the like; and a protective film 113 coated on the recording film 112. The disk substrate 111 has grooves formed on its surface wherein the width of each groove is similar to that of the data track.

The optical head 1 is arranged such that its face in which the light transmission window 26 is formed is opposed to the optical recording medium 110 and such that a part of the optical head 1 is placed in the through-hole 34 of the floating slider 30, wherein the optical head 1 is elastically supported by an optical head holder 40. The optical head holder 40 forms a plate spring that is connected to the protrusion 36 of the floating slider 30 and to the fixing portion 28 of the optical head 1. The distance between the optical recording medium 110 and the face in which the light transmission window 26 is formed is greater than the floating height of the floating slider 30.

The floating-type optical head constructed in the above-described manner operates as follows.

First, the process in which a laser beam is emitted from the light emitting device 11 and focused onto the optical recording medium 110, that is, the forward path, will be described. The laser beam emitted by the light emitting device 11 is deflected by the raising-up mirror 12 in the direction approximately perpendicular to the substrate 10. The deflected light beam passes through the inlet hole 23, and is reflected by the reflection-type hologram pattern of the optical path correcting means 25, and then led to the light condensing means 21. The light condensing means 21 is constructed with a spheric concave lens such that the curvature radius of its spherical surface is given so that the reflected laser beam is correctly focused onto the optical recording medium 110. The laser beam focused by the light condensing means 21 travels through the light transmission window 26 and then illuminates the optical recording medium 110.

The laser beam focused by the light condensing means 21 is sent out through the light transmission window 26 and travels to the recording film 112 via an air layer having a predetermined thickness and via the protective film 113 of the optical recording medium 110.

In the above arrangement, the laser beam is led to the light condensing means 21 using the reflection-type hologram pattern for reflecting the laser beam for the following reason.

In general, spherical aberration occurs when light is focused using a spheric concave lens. The outer portion of the spherical surface has a greater spherical aberration than the inner portion. The spherical aberration limits the minimum spot size of focused light, and thus limits the maximum recording density. The spherical aberration is compensated with the reflection-type hologram pattern using diffraction of light thereby preventing the spherical aberration.

In this way, the laser beam is focused by the light condensing means 21 without producing spherical aberration, and then travels through the light transmission window 26 to the optical recording medium 110.

Now, the process in which the laser beam focused onto the optical recording medium 110 travels to the photosensors 13a, 13b, 13c, and 13d, that is, the backward path, will be described.

Light projected onto the recording film 112 is reflected by the recording film, wherein the reflection depends on recorded information. The reflected light passes through the light transmission window 26, and reaches the light condensing means 21. The light further travels to the optical path correcting means 25 along an optical path in the opposite direction to that in the forward path. In the optical path correcting means 25, the reflection-type hologram pattern is formed so that light is focused onto the photosensors 13a, 13b, 13c, and 13d. That is, the light is diffracted by the optical path correcting means 25, and then passes through the outlet hole 24, and finally arrives at correct positions of the photosensor 13a, 13b, 13c, and 13d.

Figure 6A:
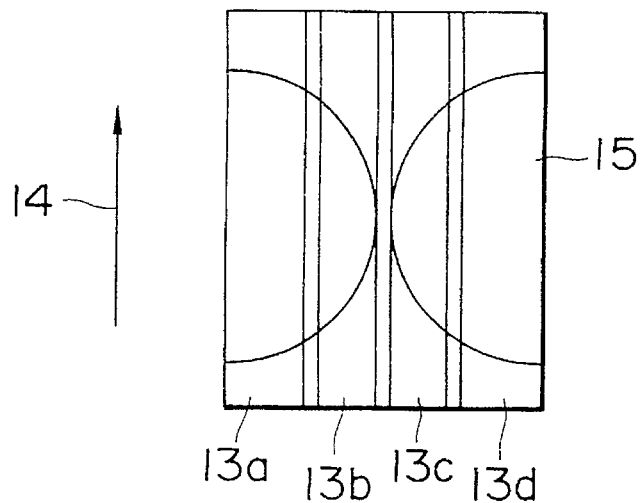
FIG. 6A is a schematic diagram illustrating tracking control of a photosensor of the first embodiment of the present invention.
Figure 6B:
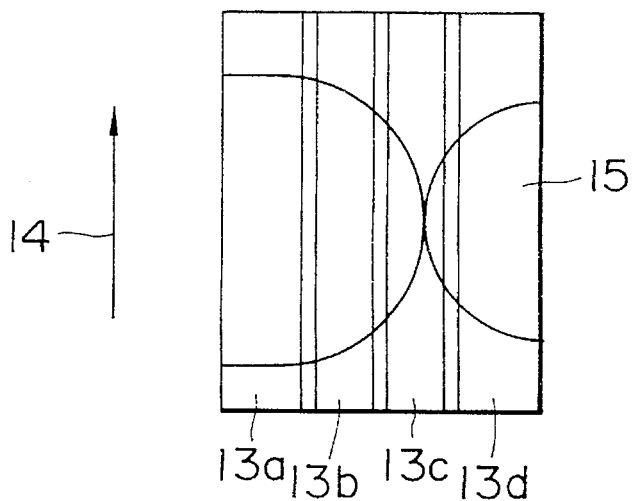
FIG. 6B is a schematic diagram illustrating a tracking deviation in a first direction in the photosensor of the first embodiment.
Figure 6C:
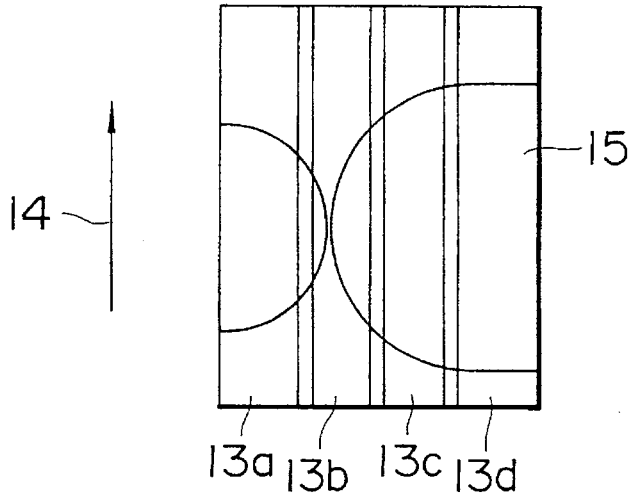
FIG. 6C is a schematic diagram illustrating a tracking deviation in a second direction that is opposite to the first direction in the photosensor of the first embodiment.

Referring to FIGS. 6A–6C, tracking control in the present embodiment will be described. FIGS. 6A–6C illustrate the spot of received light 15 focused onto the four photosensors 13a, 13b, 13c, and 13d that are disposed parallel to the data track 14 (wherein the light is correctly focused into a spot).

In FIG. 6A, light is projected into a spot on a data track of an optical recording medium with correct tracking. In this case, the sum of the amounts of light received by the photosensors 13a and 13b is equal to the sum the of amounts of light received by the photosensors 13c and 13d.

In FIG. 6B, the spot of projected light is deviated from the data track. In this case, the sum of the amounts of light received by the photosensors 13a and 13b is greater than the sum of the amounts of light received by the photosensors 13c and 13d.

In FIG. 6C, the spot of projected light is deviated from the data track in the direction opposite to that in FIG. 6B. In this case, the sum of the amounts of light received by the photosensors 13a and 13b is less than the sum of the amounts of light received by the photosensors 13c and 13d.

As can be seen from the above, if the difference between the sum of the amounts of light received by the photosensors 13a, 13b and the sum of the amounts of light received by the photosensors 13c and 13d is used as the tracking error signal, and if tracking control is done to reduce this tracking error signal to zero, then the illumination spot is tracked correctly on the data track.

Figure 7A:
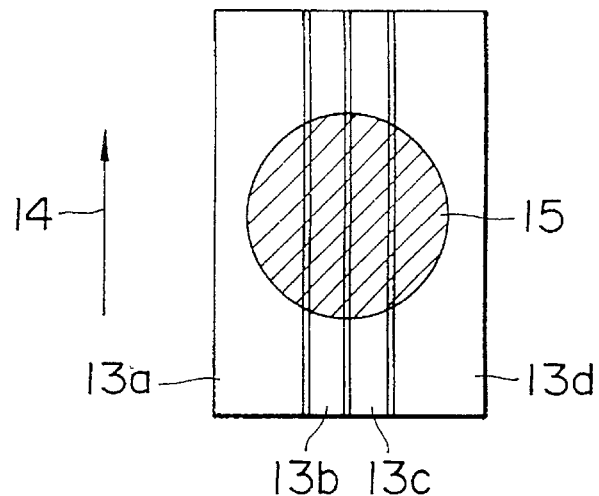
FIG. 7A is a schematic diagram illustrating focus control of the photosensor according to the first embodiment of the present invention, wherein the focus is correctly controlled.

Now, the focus control will be described referring to FIGS. 7A–7C. FIG. 7A illustrates an illumination spot that is correctly focused on the recording film of an optical recording medium. In this case, the sum of the amounts of light received by the photosensors 13a and 13d is equal to the sum of the amounts of light received by the photosensors 13b and 13c.

Figure 7B:
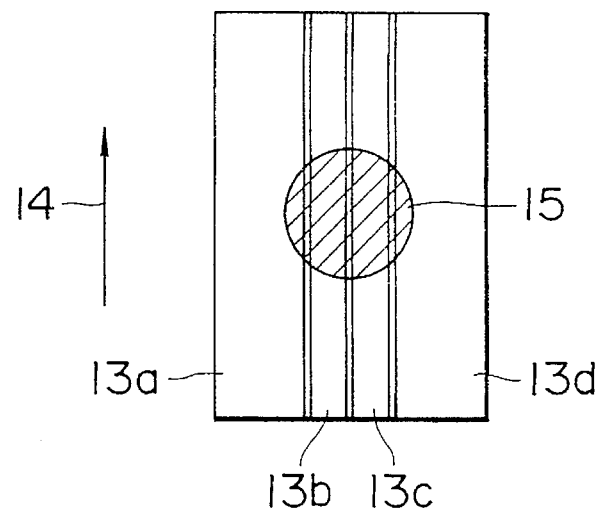
FIG. 7B is a schematic diagram illustrating a deviation toward an optical recording medium in focus control of the photosensor according to the first embodiment of the present invention.

In FIG. 7B, the illumination spot is focused at a position deviated from the correct focusing position toward the optical recording medium 110. As a result, the spot size of received light 15 is smaller than that of the spot shown in FIG. 7A. In this case, the sum of the amounts of light received by the photosensors 13a and 13d is smaller than the sum of amounts of light received by the photosensors 13b and 13c.

Figure 7C:
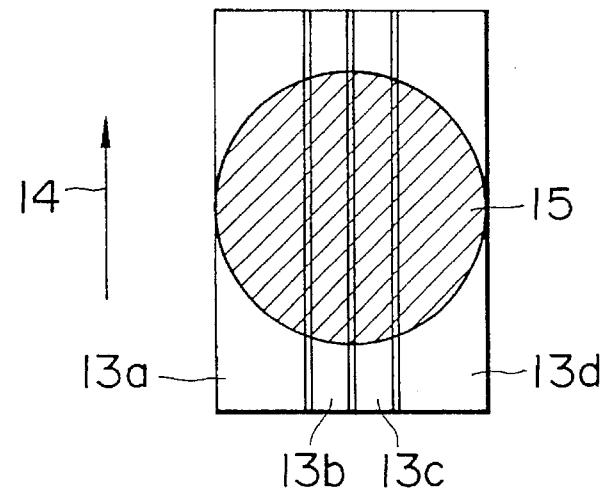
FIG. 7C is a schematic diagram illustrating a deviation toward light-condensing means in focus control of the photosensor according to the first embodiment of the present invention.

In FIG. 7C, the focusing is deviated in the direction opposite to that of FIG. 7B, and the spot size of received light 15 is larger than that of the spot shown in FIG. 7A. In this case, the sum of the amounts of light received by the photosensors 13a and 13d is greater than the sum of the amounts of light received by the photo-sensors 13b and 13c.

Thus, if the difference between the sum of the amounts of light received by the photosensors 13a, 13d and the sum of the amounts of light received by the photo-sensors 13b and 13c is used as the focusing error signal, and if focusing control is done to reduce this focusing error signal to zero, then the illumination spot is focused correctly on the recording film 112 of the optical recording medium 110.

A method of driving a focusing mechanism will now be described.

Since the optical head 1 is elastically supported by the optical head holder 40 on the floating slider 30, it is possible to drive the optical head 1 in the direction perpendicular to the optical recording medium 110 using focusing-mechanism driving means (not shown) in which the elastic deformation of the optical head holder 40 is advantageously used. In this way, the distance between the light transmission window 26 and the optical recording medium 110 is controlled to maintain correct focusing. That is, the optical head 1 is displaced so that the above-described focusing error signal becomes zero so as to correctly focus the illumination spot onto the recording surface of the optical recording medium 110.

With the above arrangement, the floating slider 30 floats following the plane vibration of the optical recording medium 110, and thus the distance between the optical head 1 and the optical recording medium 110 is maintained to a certain degree constant by the floating slider 30 and the optical head holder 40. Therefore, the movement of the optical head 1 required for the focus control is small, and thus the focusing-mechanism driving means requires only a small driving force. This allows a reduction in size of the focusing-mechanism driving means.

EMBODIMENT 2

Figure 8:
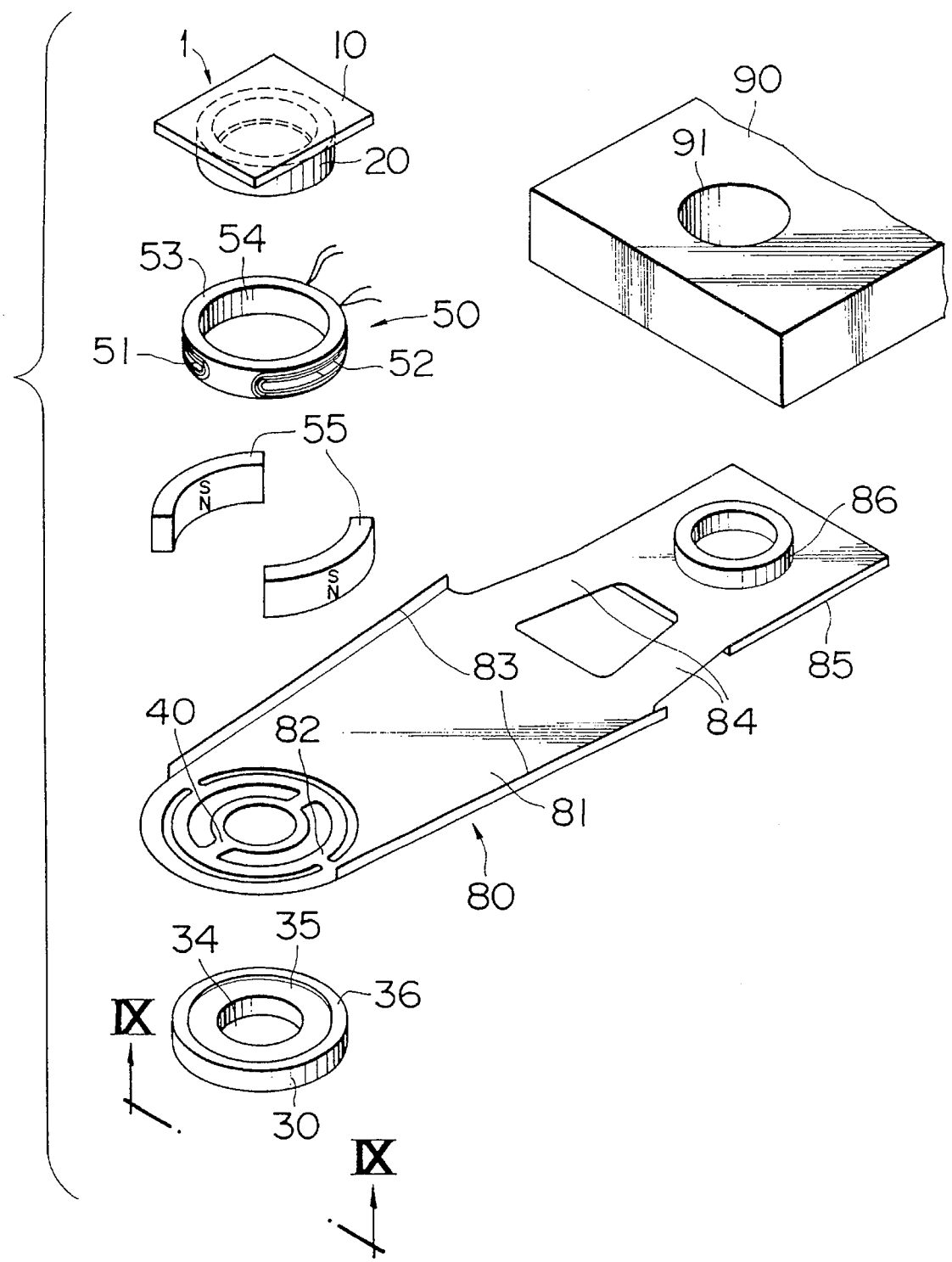
FIG. 8 is a perspective view illustrating elements such as a floating-type optical head, focus driving means, tracking-driving means, and slider holder serving as component elements of an optical recording and reproducing apparatus according to a second embodiment of the present invention.
Figure 9:
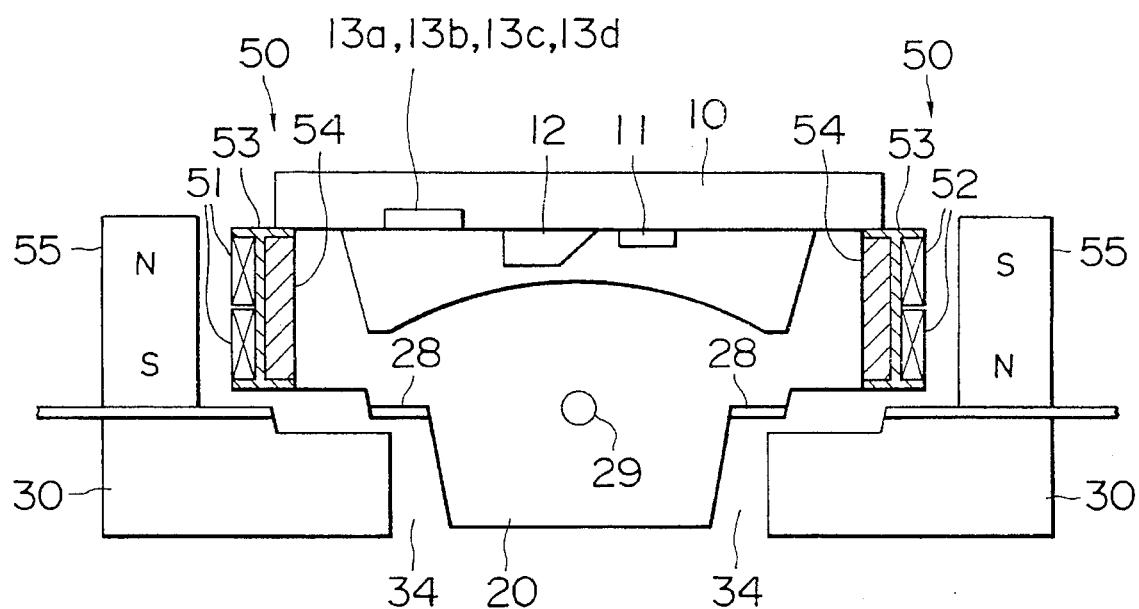
FIG. 9 is a cross-sectional view illustrating the floating-type optical head assembled with the component elements shown in FIG. 8 of the optical recording and reproducing apparatus according to the second embodiment of the present invention, wherein the cross section is taken in the direction perpendicular to a track (along the line IX—IX of FIG. 8) at a center position of the floating-type of the optical head.

Referring to FIGS. 8 and 9, a second embodiment of an optical recording and reproducing apparatus according to the present invention will be described.

FIG. 8 is a perspective view illustrating component elements such as a floating-type optical head, focusing-mechanism driving means, tracking-mechanism driving means, and slider holder of the second embodiment of the optical recording and reproducing apparatus. FIG. 9 is a cross-sectional view illustrating the floating-type optical head assembled with the component elements shown in FIG. 8, wherein the cross section is taken in the direction perpendicular to a track (along the line IX—IX of FIG. 8) at the center position of the assembled floating-type of the optical head.

As shown in FIGS. 8 and 9, the present embodiment of the optical recording and reproducing apparatus has a driving coil 50 serving as focusing-mechanism driving means as well as tracking-mechanism driving means for driving the optical head 1 of the previous embodiment. The driving coil 50 comprises: a bobbin 53 molded in the form of a cylindrical frame with a material such as a resin, a ring-shaped yoke 54 made of a magnetic material disposed inside the cylindrical frame of the bobbin 53; and a first and second coils 51 and 52 disposed outside the cylindrical frame of the bobbin 53. Both first and second coils 51 and 52 have the same number of turns, and they are wound in a substantially symmetrical fashion. The driving coil 50 is adhesively fixed to an optical element 20 of the optical head 1. The structures of both optical head 1 and floating slider 30 are similar to those shown in FIG. 1 and FIG. 4, and therefore they will not be explained here again.

Magnets 55 are disposed surrounding the driving coil 50 so that the magnets 55 and the driving coil 50 form an electromagnetic actuator.

The main portion of the apparatus has an arm 90 supported in such a manner that the arm 90 can move in directions across tracks of an optical recording medium 110. A slider holder 80 for pressing and supporting the floating slider 30 is fixed to an end of the arm 90. The slider holder 80 is fixed to the arm 90 by caulking a caulking element 86 formed in a fixing plate 85 to the arm 90 via a fixing hole 91 formed in the end portion of the arm 90.

The slider holder 80 has: a pressure spring 84 for pressing the floating slider 30 at a constant pressure; a wide portion 81; and bent portions 83.

A gimbal 82 is formed at an end portion of the wide portion 81 of the slider holder 80 using an etching technique or the like. The protrusion 36 of the floating slider 30 is fixed to the gimbal 82, wherein the gimbal 82 allows the floating slider 30 to have a certain degree of freedom when the floating slider 30 floats.

In this embodiment, the gimbal 82, the pressure spring 84, wide portion 81, and bent portion 83 are all made of the same material. The gimbal 82 is formed by etching the material into the thickness direction thereby reducing the rigidity. Alternatively, the gimbal 82 may also be made of a separate thin plate and may be connected to an end of the wide portion 81 by means of welding or the like.

An optical head holder 40 is formed in the center of the gimbal 82 wherein the optical head holder 40 is also made of the same material as that of the gimbal 82 by means of etching or the like. The optical head holder 40 is connected to both protrusion 36 of the floating slider 30 and the fixing portion 28 of the optical head 1 so that the optical head 1 is elastically supported by the floating slider 30. With this arrangement, the optical head 1 has freedom in bending directions of the optical head holder 40 (in focusing-driving directions) as well as in twisting directions (in directions of rotating the optical head holder 40 about its center).

The focus control method as well as the tracking control method in this floating-type optical head having the above-described structure will be described referring to FIG. 9.

The driving method in the focus control will be described first.

The optical head 1 is elastically supported on the floating slider 30 via the optical head holder 40 in such a manner that the optical head 1 can move in the focus driving directions. The ring-shaped driving coil 50 is disposed at an outer peripheral portion of the optical element 20 of the optical head 1 in such a manner that the ring-shaped driving coil 50 can move in the focus driving directions. The driving coil 50 comprises the yoke 54, the bobbin 53, the first coil 51, and the second coil 52 wherein both first and second coils 51 and 52 fixed to the bobbin 53 have the same number of turns and they are wound in substantially symmetrical fashion. The magnets 55 are disposed in a substantially symmetrical positions opposed to the first coil 51 and the second coil 52, wherein the magnets 55 are fixed to the protrusion 36 of the floating slider 30 via the gimbal 82. The driving coil 50 and the magnets 55 form a magnetic circuit.

When a current flows through the first coil 51, thrust is generated at the side of the first coil 51 according to Fleming's left-hand rule. As a result, the optical head 1 supported by the optical head holder 40 is subjected to a moment force that drives the optical head 1 around the center (denoted by reference numeral 29 in FIG. 9) of the optical head holder 40. Similarly, when a current flows through the second coil 52, thrust is generated at the side of the second coil 52, and the optical head 1 is subjected to moment.

If currents are passed through the first coil 51 and the second coil 52 in the same direction so that the same magnitude of thrust is generated, then moments are canceled and the optical head 1 is subjected to only driving force in the focusing directions. This driving force is the sum of the thrust produced by the first coil 51 and the thrust produced by the second coil 52. The optical head 1 is displaced until balance is achieved between the driving force and the bending-direction restoring force of the optical head holder 40 that supports the optical head 1.

The focus control is done by controlling the amount of current flowing through the first coil 51 and the second coil 52 maintaining the current such that the thrusts generated by the two coils are equal to each other.

More specifically, the current flowing each of the first coil 51 and the second coil 52 is controlled such that focusing error signal (refer to FIG. 7), defined as the difference between the sum of the amounts of light received by the above-described photosensors 13a and 13d and the sum of the amounts of light received by the above-described photosensors 13b and 13c, becomes zero, thereby focusing the light beam emitted by the optical head 1 correctly onto an optical recording medium 110.

Now, the fine driving method in the tracking control will be described.

The driving for the fine tracking is also done by controlling the current flowing through the first and second coils 51 and 52 as in the focusing control. The difference from the case of the driving for focusing control is that there is a difference in current between the first coil 51 and the second coil 52. If currents are passed through the coils in such a manner, then, unlike the case of the driving in the focusing control, the moment produced by each coil does not cancel each other, and therefore the optical head 1 is subjected to the net moment equal to the difference between these moments. As a result, the optical head 1 rotates about the center of the optical head holder 40 until balance is achieved between the above net moment and the twisting-direction restoring force of the optical head holder 40. In this rotation process, the spot of light produced by the optical head 1 moves across the data tracks on an optical recording medium 110.

As can be seen from the above discussion, the driving for fine tracking can be done by controlling the difference in current between the first coil 51 and the second coil 52.

More specifically, the current flowing through each of the first coil 51 and the second coil 52 is controlled such that the tracking error signal (refer to FIG. 6), defined as the difference between the sum of the amounts of light received by the photosensors 13a and 13b and the sum of the amounts of light received by the photosensors 13c and 13d, becomes zero, thereby achieving correct tracking of the spot of light emitted by the optical head 1 on a track of an optical recording medium 110.

EMBODIMENT 3

Figure 10:
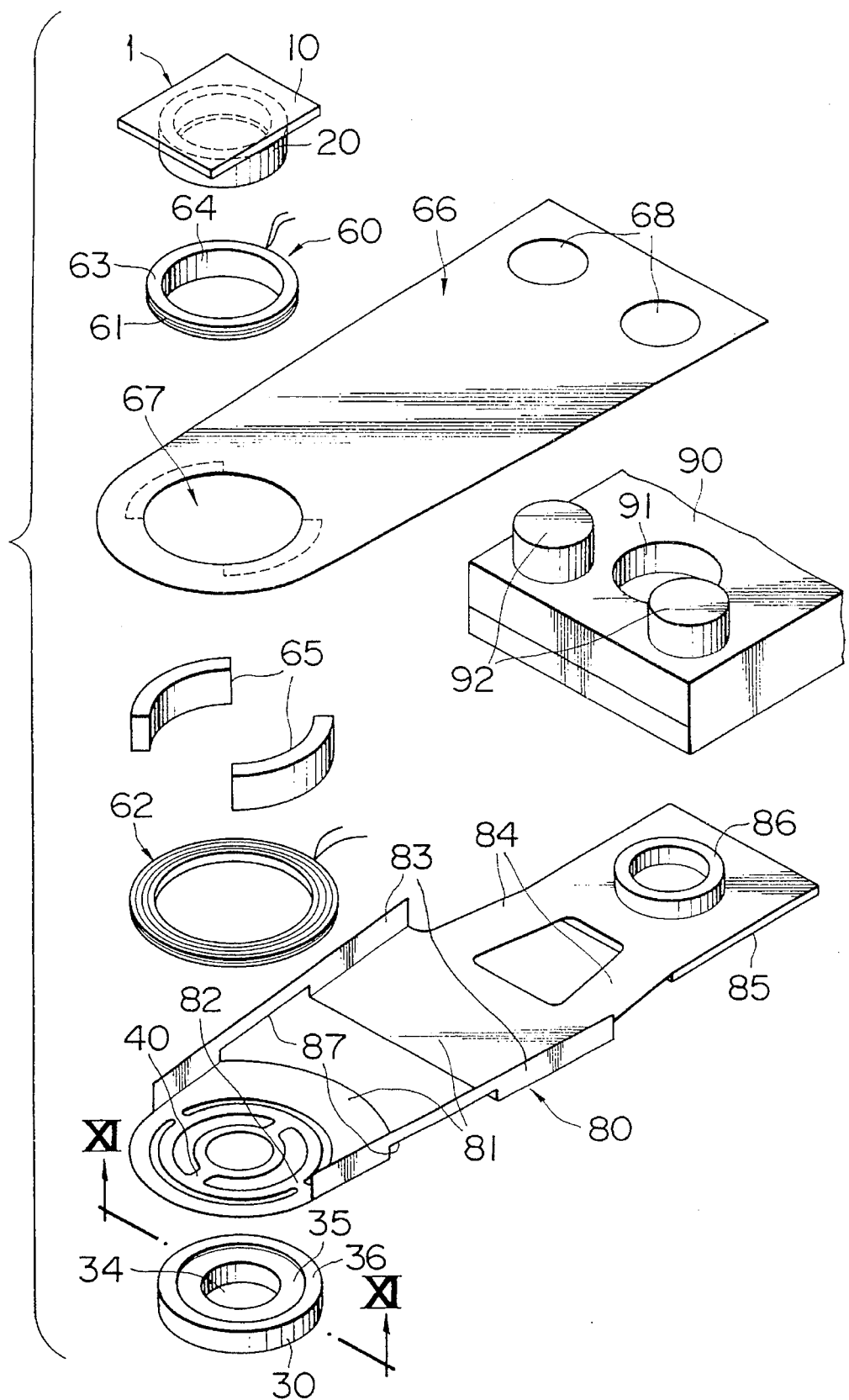
FIG. 10 is a perspective view illustrating elements such as a floating-type optical head, focus driving means, tracking-driving means, and slider holder, serving as component elements of an optical recording and reproducing apparatus according to a third embodiment of the present invention.
Figure 11:
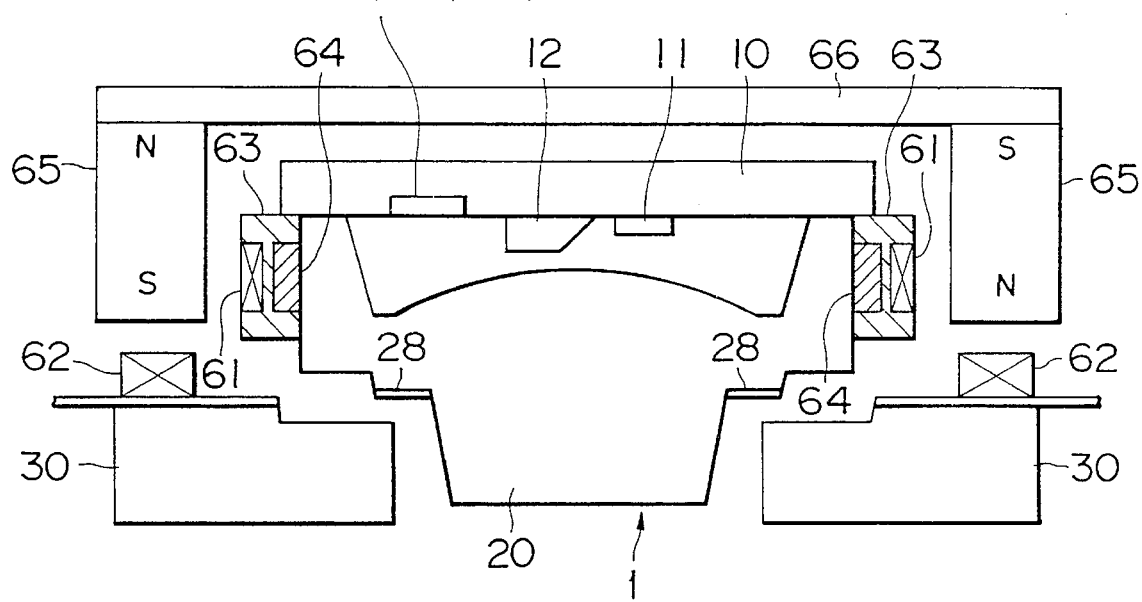
FIG. 11 is a cross-sectional view illustrating the floating-type optical head assembled with the component elements shown in FIG. 10 of the optical recording and reproducing apparatus according to the third embodiment of the present invention, wherein the cross section is taken in the direction perpendicular to a track (along the line XI—XI of FIG. 10) at a center position of the floating-type of the optical head.

Referring to FIGS. 10 and 11, a third embodiment of an optical recording and reproducing apparatus according to the present invention will be described.

FIG. 10 is a perspective view illustrating elements such as a floating-type optical head, focusing-mechanism driving means, tracking-mechanism driving means, and a slider holder, serving as component elements of an optical recording and reproducing apparatus according to the third embodiment of the present invention. FIG. 11 is a cross-sectional view illustrating the floating-type optical head assembled with the component elements shown in FIG. 10 wherein the cross section is taken in the direction perpendicular to a track (along the line XI—XI of FIG. 10) at the center position of the assembled floating-type of the optical head.

In the present embodiment of the optical recording and reproducing apparatus shown in FIGS. 10 and 11, there is provided a focus driving coil unit 60 corresponding to focusing-mechanism driving means for driving the optical head 1 of the previous embodiment. The focus driving coil unit 60 comprises: a ring-shaped yoke 64 made of a magnetic material; a molded bobbin 63 made of a material such as resin attached around the yoke 64; and focus driving coil 61 wound around the bobbin 63. The focus driving coil 61 is wound along the outer cylindrical side of the bobbin 63. There are also provided a magnet 65 and a tracking-mechanism driving coil 62 wound in a ring-shaped form serving as the tracking-mechanism driving means. The magnet is fixed with a magnet supporting element 66. Fixing holes 68 are formed at one end of the magnet supporting element 66, and a through-hole 67 having a diameter greater than the outer diameter of the focus driving coil unit 60 is formed at the other end. Since the structures of both optical head 1 and floating slider 30 are similar to those shown in FIG. 1 and FIG. 4, they will not be explained here again.

The main portion of the apparatus has an arm 90 supported in such a manner that the arm 90 can move in directions across tracks of an optical recording medium 110. A slider holder 80 for pressing and supporting the floating slider 30 is fixed to an end of the arm 90. The slider holder 80 is fixed to the arm 90 by caulking a caulking element 86 formed in a fixing plate 85 to the arm 90 via a fixing hole 91 formed in the end portion of the arm 90.

The slider holder 80 has: a pressure spring 84 for pressing the floating slider 30 at a constant pressure; a wide portion 81; and bent portions 83. A tracking-mechanism supporting spring 87 having elasticity in tracking directions is formed in the wide portion 81 and bent portion 83.

A gimbal 82 is formed at an end portion of the wide portion 81 of the slider holder 80 using an etching technique or the like. The protrusion 36 of the floating slider 30 is fixed to the gimbal 82, wherein the gimbal 82 allows the floating slider 30 to have a certain degree of freedom when the floating slider 30 floats.

An optical head holder 40 is formed made of the same material as that of the gimbal 82 by means of etching or the like. The fixing portion 28 of the optical head 1 and the protrusion 36 of the floating slider 30 are fixed to the fixing portion 28 of the optical head holder 40 whereby the optical head 1 is supported in such a manner that the optical head can move in the focus driving directions.

The floating slider 30 that supports the optical head 1 is elastically supported by the tracking-mechanism supporting spring 97 formed in the slider holder 80 such that the floating slider 30 can move in the tracking directions.

The focus driving coil unit 60 is fixed to an outer peripheral position of the optical element 20. The tracking-mechanism driving coil 62 is fixed to the protrusion 36 of the floating slider 30 via the gimbal 82. The magnet 65 is fixed to an end of the magnet supporting element 66, and the magnet supporting element 66 is fixed by caulking to the end of the arm 90 with bosses formed of a resin or the like via the fixing holes 68 of the magnet supporting element 66. In this arrangement, the magnet 65 is disposed such that the magnet 65 surrounds the focus driving coil unit 60 at a location disposed to the tracking-mechanism driving coil 62. In this way, a focusing electromagnetic actuator is formed with the focus driving coil unit 60 and the magnet 65, and a tracking electromagnetic actuator is formed with the tracking-mechanism driving coil 62 and the magnet 65. Preferably, the floating slider 30 is made of a magnetic material so that the floating slider 30 also serves as a yoke so as to achieve efficient interlinkage of the magnetic flux produced by the magnet 65 with the tracking-mechanism driving coil 62.

Now, the driving method in the focus control of the third embodiment will be described.

The driving for the focus control is done by passing a current through the focus driving coil unit 60. In the above structure, the magnetic flux produced by the magnet 65 has interlinkage with the focus driving coil unit 60. Since the focus driving coil unit 60 is fixed to the optical element 20 of the optical head 1, when a current flows through the focus driving coil unit 60, the optical head 1 is subjected to thrust according to Fleming's left-hand rule in the focus driving direction. On the other hand, since the optical head 1 is supported on the floating slider 30 via the optical head holder 40, the optical head 1 moves to a position that gives balance between the above thrust and the restoring force of the optical head holder 40.

More specifically, if the current is controlled such that the focusing error signal (refer to FIG. 7) described above becomes zero, then the optical head 1 is displaced to a position that results in correct focusing of the spot of light emitted by the optical head 1 onto an optical recording medium 110.

The driving method in the tracking control of the third embodiment will be described.

The driving for the tracking control is done by passing a current through the tracking-mechanism driving coil 62. Since the tracking-mechanism driving coil 62 is fixed to the floating slider 30, and since the magnetic flux generated by the magnet 65 has interlinkage with the tracking-mechanism driving coil 62, when a current flows through the tracking-mechanism driving coil 62, the floating slider 30 is subjected to the thrust in the directions across a track. Since the floating slider 30 is elastically supported by the tracking-mechanism supporting spring 87 formed in the slider holder 80 such that the floating slider 30 can move in the tracking-driving direction, the floating slider 30 moves to a position that gives balance between the above thrust and the restoring force of the tracking-mechanism supporting spring 87. Since the optical head 1 is supported by floating slider 30, the optical head 1 is also moved in the direction across the track.

More specifically, if the current is controlled such that the above-described tracking error signal (refer to FIG. 6) becomes zero, then the floating slider 30 is displaced to a position that results in correct tracking of the spot of light emitted by the optical head 1 onto an optical recording medium 110.

In the third embodiment, in addition to the tracking control by the tracking actuator, fine tracking control is also done by the fine tracking mechanism driving means. That is, two-step control is performed in the third embodiment. However, if the decentering of data tracks of an optical recording medium 110 is small enough, and if the optical recording medium 110 having a small diameter of for example 1.8 inches is fixed to a spindle motor as in the case of a magnetic recording and reproducing apparatus, only the tracking actuator is enough to perform good tracking control. In this case, the tracking-mechanism driving coil 62, the magnet supporting element 66, and the tracking-mechanism supporting spring 87 of the slider holder 80 shown in FIG. 10 all become unnecessary, and the magnet 65 may be fixed to the protrusion 36 of the floating slider 39 via the gimbal 82.

EMBODIMENT 4

Figure 12:
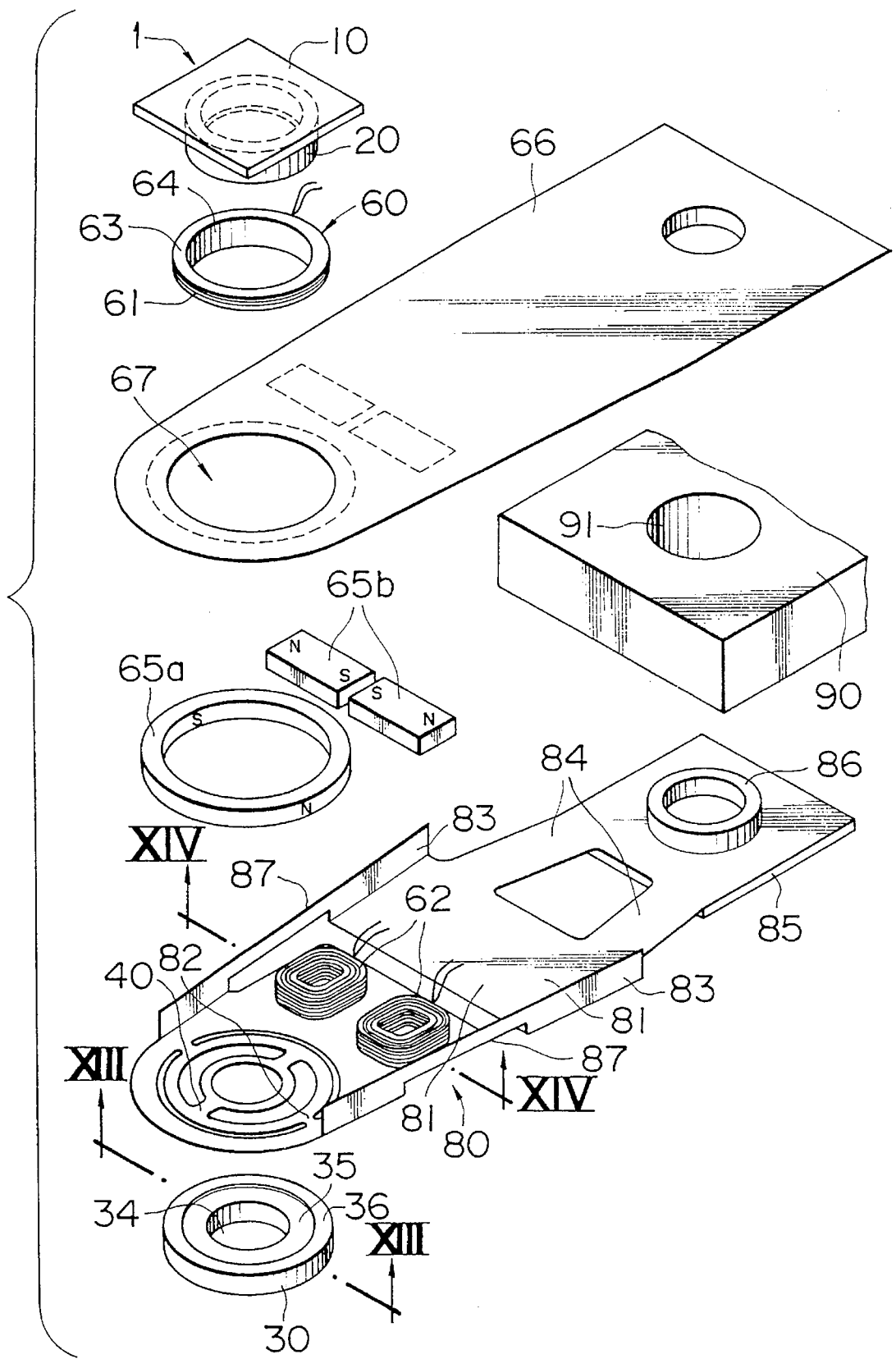
FIG. 12 is a perspective view illustrating elements such as a floating-type optical head, focus driving means, tracking-driving means, and a slider holder serving as component elements of an optical recording and reproducing apparatus according to a fourth embodiment of the present invention.
Figure 13:
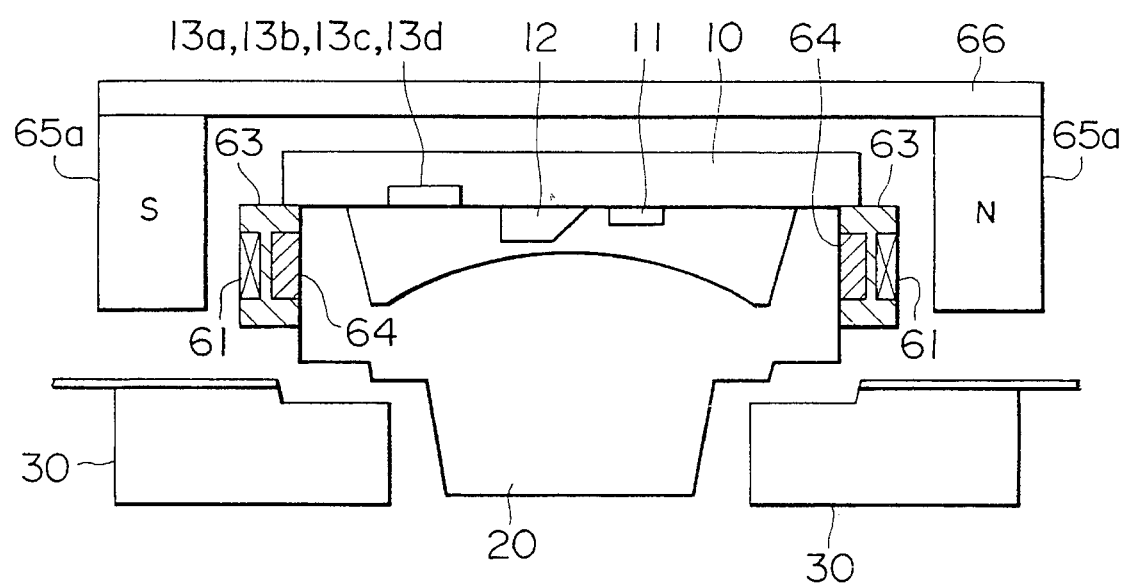
FIG. 13 is a cross-sectional view illustrating the floating-type optical head assembled with the elements shown in FIG. 12 of the optical recording and reproducing apparatus according to the fourth embodiment of the present invention, wherein the cross section is taken in the direction perpendicular to a track (along the line XIII—XIII of FIG. 12) at a center position of the floating-type of the optical head.
Figure 14:
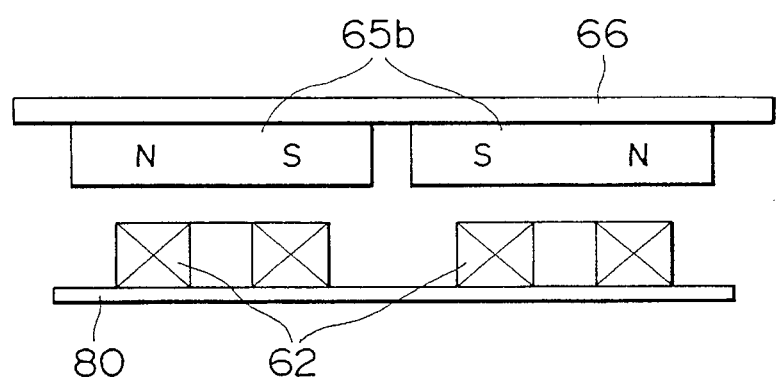
FIG. 14 is a cross-sectional view illustrating a tracking-driving coil provided in the slider holder of the floating-type optical head assembled with the elements shown in FIG. 12 of the optical recording and reproducing apparatus according to the fourth embodiment of the present invention, wherein the cross section is taken in the direction perpendicular to a track (along the line XIV—XIV of FIG. 12)

Referring to FIGS. 12, 13 and 14, a fourth embodiment of an optical recording and reproducing apparatus according to the present invention will be described.

In the present embodiment, the optical recording and reproducing apparatus has a similar structure to that of the third embodiment except that the tracking-mechanism driving means has a structure different form then that of the third embodiment.

FIG. 12 is a perspective view illustrating elements such as a floating-type optical head, focusing-mechanism driving means, tracking-mechanism driving means, and slider holder, serving as component elements of the optical recording and reproducing apparatus according to the fourth embodiment of the present invention. FIG. 13 is a cross-sectional view illustrating the floating-type optical head assembled with the component elements shown in FIG. 12 wherein the cross section is taken in the direction perpendicular to a track (along the line XIII—XIII of FIG. 12) at the center position of the assembled floating-type of the optical head. FIG. 14 is a cross-sectional view illustrating a tracking-mechanism driving coil 62 disposed in a slider holder 80 of the floating-type optical head assembled with the component elements shown in FIG. 12 wherein the cross section is taken in the direction perpendicular to a track (along the line XIV—XIV of FIG. 12).

In this embodiment shown in FIGS. 12 and 13, the optical recording and reproducing apparatus has a focus driving coil unit 60 serving as the focusing-mechanism driving means for displacing the optical head 1 of the previous embodiment, and also has a magnet 65a for producing a magnetic flux having interlinkage with the focus driving coil unit 60. In this embodiment, the magnet 65a is formed in a ring shape. The focus driving coil unit 60 has the same structure as that in the third embodiment, and is fixed to an optical element 20 of the optical head 1. The magnet 65a is fixed to a magnet supporting element 66 in such a manner that the magnet 65a surround the focus driving coil unit 60. Alternatively, the magnet 65a may also be fixed to a protrusion 36 of a floating slider 30. The driving for the focus control is done in the same manner as in the third embodiment, and will not be explained here again.

As shown in FIGS. 12 and 14, the tracking-mechanism driving coil 62 comprises a pair of coils wounded in a rectangular shape that are fixed to a wide portion 81 of the slider holder 80 at a position more outer than the position at which a tracking-mechanism supporting spring 87 is formed. There are also disposed two magnets 65b fixed to the magnet supporting element 66, such that magnetic fluxes produced by these magnets 65 have interlinkage with respective tracking-mechanism driving coils 62.

The driving for the tracking control is done by passing a current through the tracking-mechanism driving coils 62. When a current flows through the tracking-mechanism driving coils 62, the tracking-mechanism driving coils 62 are subjected to the thrust produced according to Fleming's left-hand rule. This thrust causes the floating slider 30 to move in the directions across a track. Since the tracking-mechanism driving coil 62 and the floating slider 30 are located at the position more outer than the position of the tracking-mechanism supporting spring 87, the floating slider 30 moves until balance is achieved between the above thrust and the tracking-direction restoring force of the tracking-mechanism supporting spring. Therefore, if the currents flowing through the tracking-mechanism driving coils 62 are controlled such that the tracking error signal (refer to FIG. 7) of the optical head 1 becomes zero, then correct tracking associated with the spot of light emitted by the optical head 1 onto an optical recording medium 110 is achieved.

EMBODIMENT 5

Figure 15:
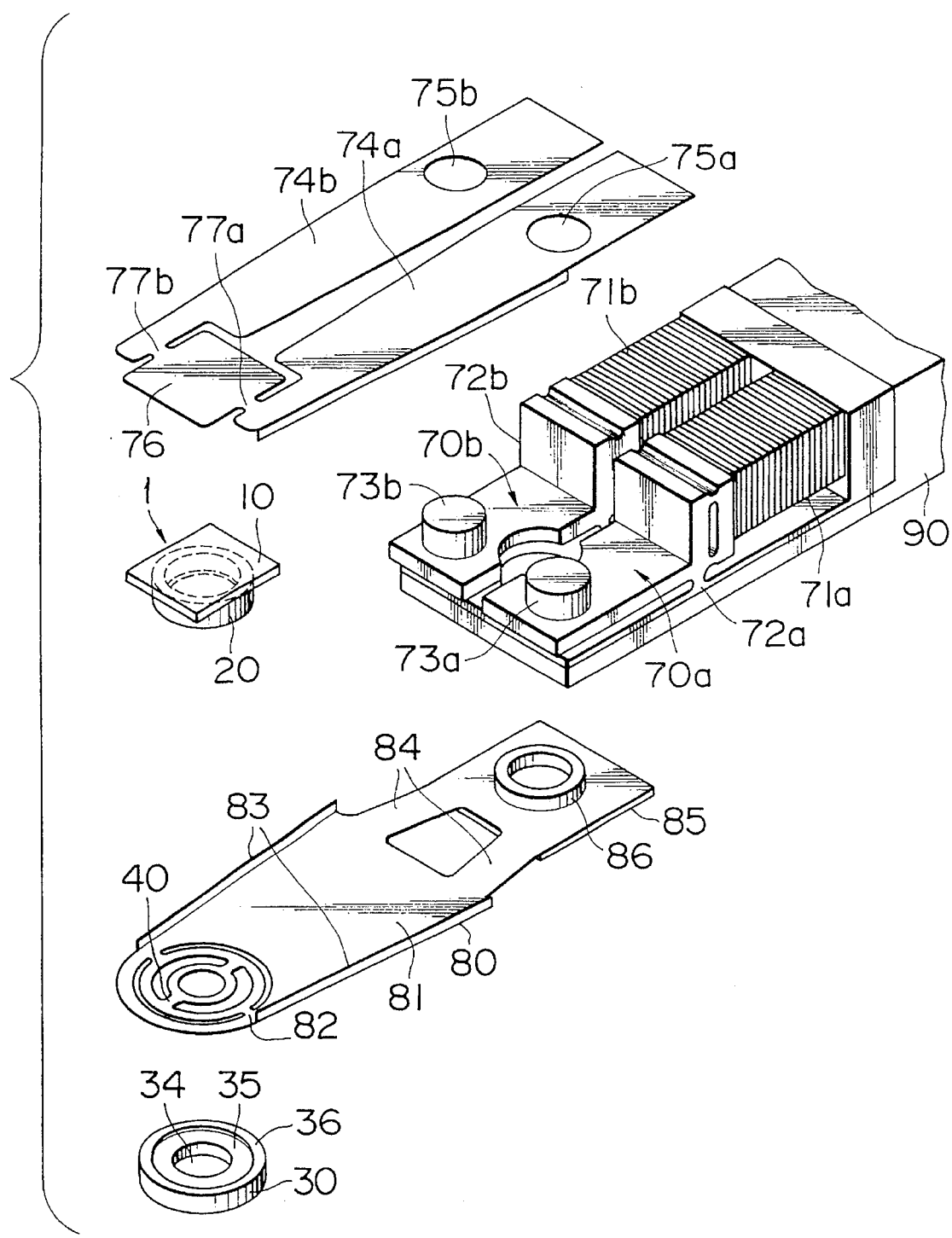
FIG. 15 is a perspective view illustrating elements used for constructing an optical recording and reproducing apparatus according to a fifth embodiment of the present invention.

Referring to FIG. 15, a fifth embodiment of an optical recording and reproducing apparatus will be described. FIG. 15 is a perspective view illustrating component elements of the optical recording and reproducing apparatus of the fifth embodiment.

The optical recording and reproducing apparatus of this fifth embodiment is similar to that of the second embodiment except that focusing-mechanism driving means and tracking-mechanism driving means have different structures from those of the second embodiment. Only those different portions will be described below.

As shown in FIG. 15, the apparatus of the present embodiment has displacement enlarging elements 70a and 70b made of resin or the like that are disposed at an end portion of an arm 90. These displacement enlarging elements 70a and 70b are formed in symmetrical forms having a symmetry axis extending along the center of the arm 90 in its longitudinal direction. The displacement enlarging elements 70a and 70b have hinges 72a and 72b, respectively. In FIG. 15, reference numerals 71a and 71b denote piezoelectric elements that are displaced slightly in the longitudinal direction of the arm 90 in response to an applied voltage. Optical head displacing elements 74a and 74b are fixed to ends of the respective displacement enlarging elements 70a and 70b with bosses 73a and 73b via through-holes 75a and 75b wherein fixing is done by heat caulking. The ends of these optical head displacing elements 74a and 74b are connected to each other by an optical head fixing element 76 via necking portions 77a and 77b.

In the optical recording and reproducing apparatus constructed in the above-described manner, the driving for the focus control and the tracking control is done as follows.

When the piezoelectric element 71a and 71b are displaced, slight rotational displacements around the hinges 72a and 72b acting as supporting points occur in the respective displacement enlarging elements 70a and 70b. These slight displacements are transmitted toward the optical head displacing elements 74a and 74b disposed at the ends of the displacement enlarging elements 70a and 70b. In this transmission process, the end portions of the optical head displacing elements 74a and 74b show relatively great displacements due to the principle of the lever. Thus, the optical head 1 is displaced via the necking portions 77a and 77b.

The driving for the focusing control is done by applying voltages having the same magnitude to both piezo-electric elements 71a and 71b. As a result of such driving, the optical head displacing elements 74a and 74b are displaced by the same amount, whereby the optical head 1 is displaced in the focus driving directions. As can be seen from the above discussion, if applied voltages are controlled so that the focusing error signal becomes zero, then the focusing is controlled correctly.

On the other hand, the driving for the tracking control is done by different voltages to the piezo-electric elements 71a and 71b. As a result of such driving, the optical head displacing elements 74a and 74b are displaced by different amounts, and thus the optical head 1 has a slight rotational displacement in the same direction as that of the greater displacement of the optical head displacing elements 74a and 74b. This displacement of the optical head produces a slight displacement of the spot of light projected by the optical head 1 in the direction across a track. As can be seen from the above discussion, if the applied voltages are controlled such that the tracking error signal becomes zero, then the tracking is controlled correctly.

EMBODIMENT 6

Figure 16:
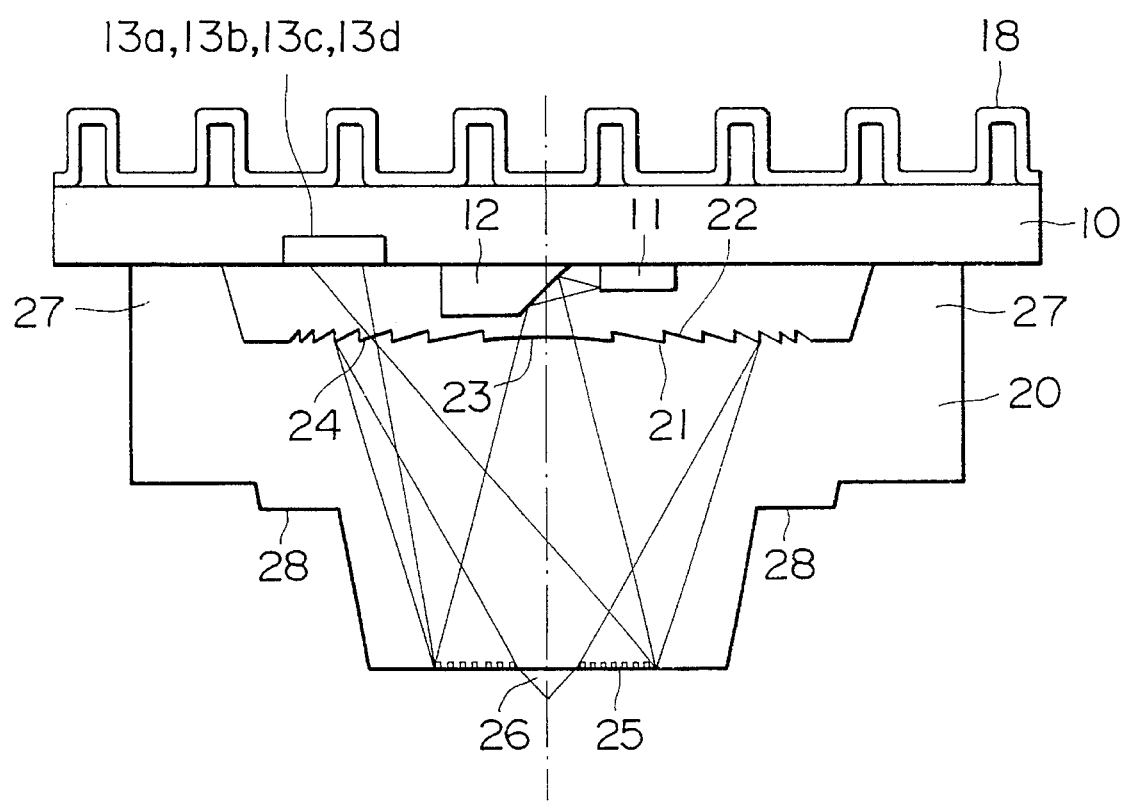
FIG. 16 is a cross-sectional view illustrating an optical head forming a floating-type optical head according to a sixth embodiment of the present invention, wherein the cross section is taken at its center position in the direction along a track.
Figure 17:
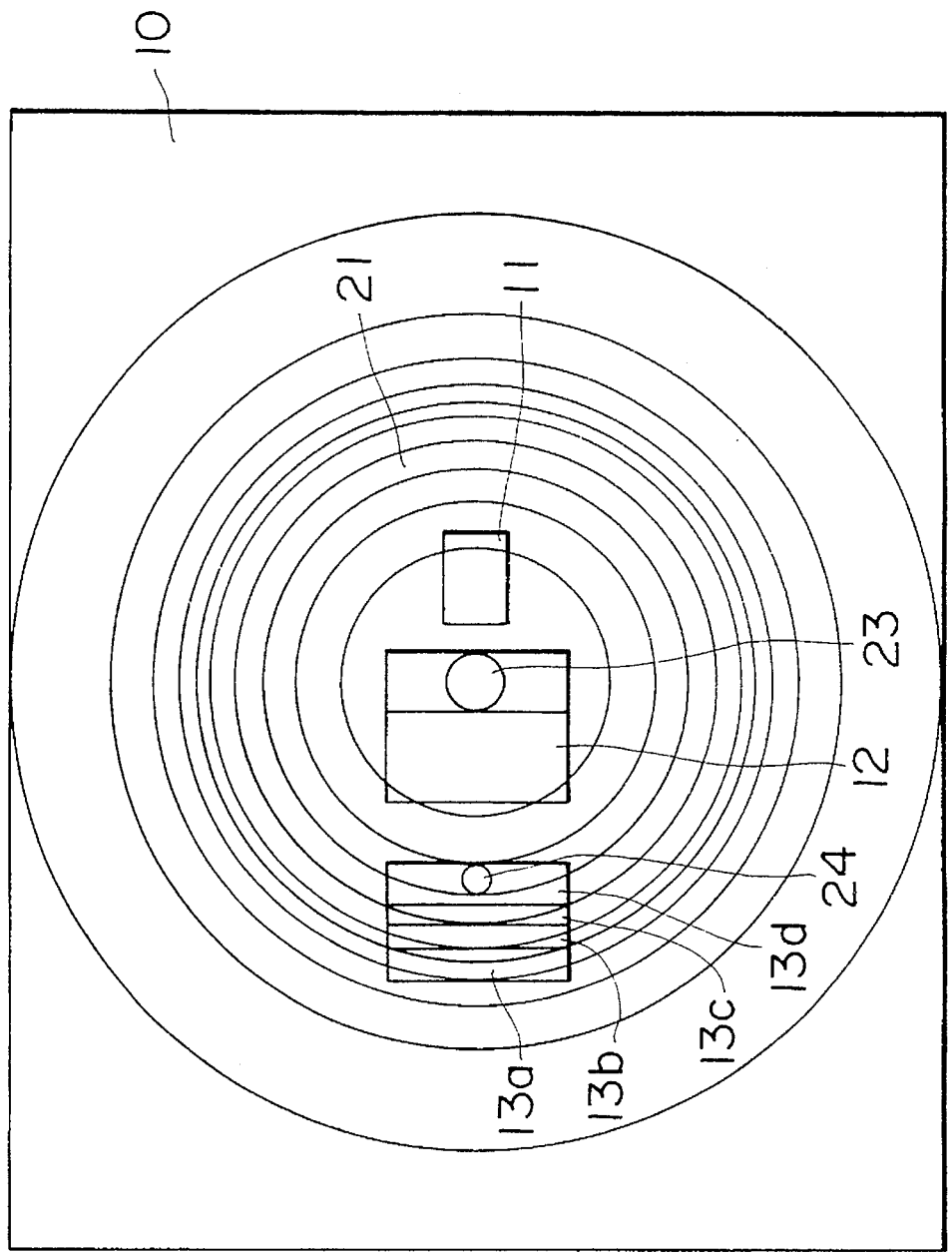
FIG. 17 is a perspective top view illustrating the optical head forming the floating-type of optical head according to the sixth embodiment of the present invention.
Figure 18:
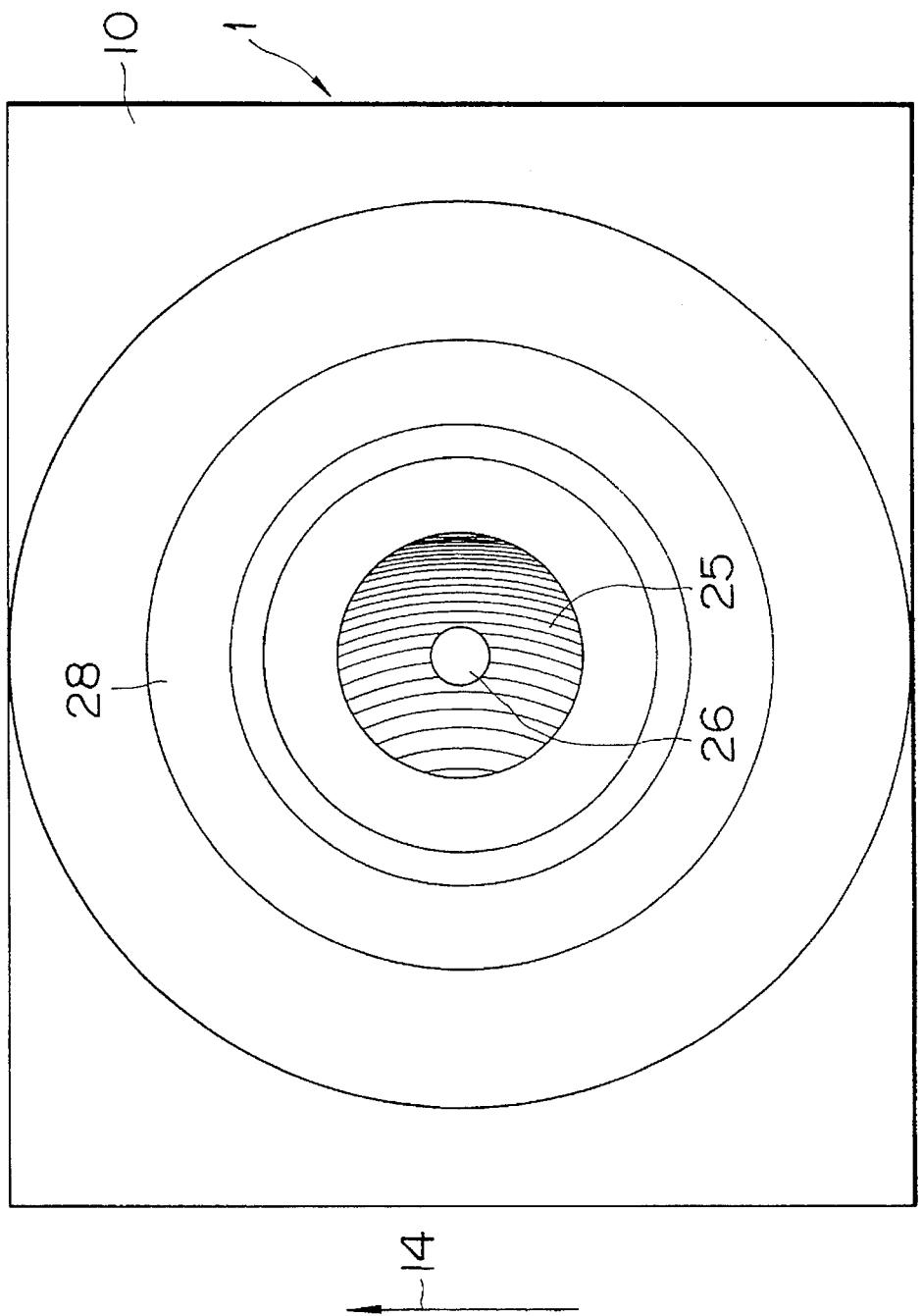
FIG. 18 is a perspective bottom view illustrating the optical head forming the floating-type of optical head according to the sixth embodiment of the present invention.
Figure 19:
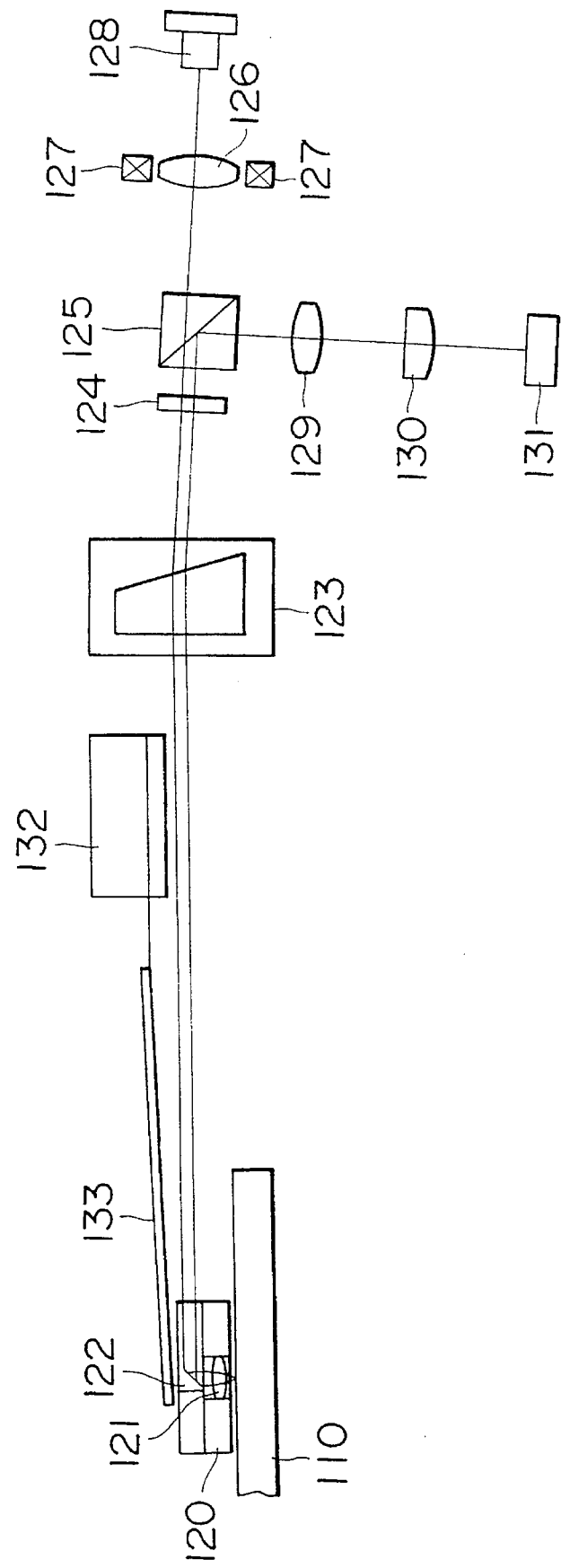
FIG. 19 is a side view of a conventional floating-type optical head.

Referring to FIGS. 16–18, an embodiment of an optical head 1 for use in a floating-type optical head according to the present invention will be described. FIG. 16 is a cross-sectional view of the optical head 1 wherein the cross section is taken at its center in the direction along a track. FIG. 17 is a perspective top view of the optical head 1, and FIG. 18 is a perspective bottom view of the optical head 1.

In this embodiment, a Fresnel lens is used as light condensing means 21 instead of the spheric concave lens used in the first embodiment. This Fresnel lens can perform the same function as that performed by the spheric concave lens and by the reflection-type hologram pattern that corrects the spherical aberration in the optical head 1 (refer to FIGS. 1–3) of the floating-type optical head in the first embodiment.

The reason for that will be described below.

In general, when a reflection-type concave lens is used to prevent spherical aberration, it is known that the lens should have an aspheric form. This means that the spherical aberration can be prevented if an aspherical lens is used as light condensing means 21. However, it is difficult to produce an aspheric lens, and thus it is expensive. However, if the aspheric lens is divided into a plurality of circular-band lenses, it becomes possible to reduce the thickness of the individual lenses to a very small level. This allows the lenses to be produced easily.

In view of the above, optical path correcting means 25 of the present embodiment comprises only a reflection-type hologram pattern for leading a light beam passing through the Fresnel lens to photosensors 13a–13b.

With this arrangement, the thickness of the light condensing means 21 can be reduced to a great extent, and therefore it becomes possible to further reduce the size of the optical head 1.

Alternatively, a reflection-type hologram lens may be used as the light condensing means 21.

An optical head formed in an integral fashion has a problem arising from heat generation of a light emitting device. Heat can change the wavelength of light, which results in an increase in aberration, and thus results in an increase in the minimum spot size of light. Furthermore, heat can produce noise called mode hopping noise which results in degradation in the signal-to-noise ratio of a signal. In the worst case, heat generation can destroy devices. To avoid the above problems, the optical head of the present embodiment has a cooling plate 18 fixed to a face of the substrate 10 opposite to the face on which the light emitting device 11 is disposed.

EMBODIMENT 7

Figure 20:
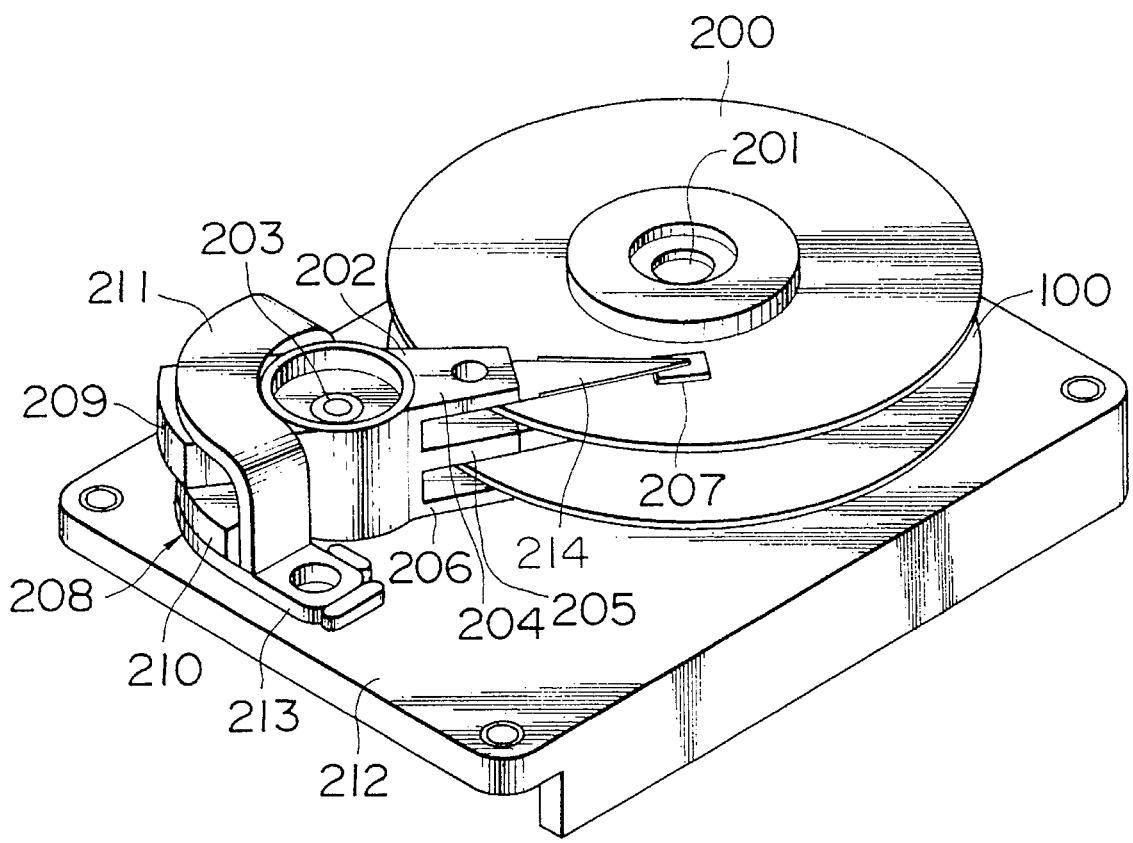
FIG. 20 is a perspective view illustrating a seventh embodiment of an optical recording and reproducing apparatus according to the present invention.

FIG. 20 is a perspective view of a seventh embodiment of an optical recording and reproducing apparatus. In FIG. 20, reference numeral 200 denotes a plurality of optical media that are fixed to the same revolving shaft 201. In this example, two sheets of media 200 are used. However, one sheet or three or more sheets of media may also be used. The revolving shaft 201 is connected to driving means such as a spindle motor (not shown). Reference numeral 202 denotes an arm that rotates about the revolving shaft 203. Fixing portions 204, 205, and 206 project from the end portion of the arm 202 at the side of the media 200. Each fixing portion 204, 205, and 206 has a suspension 214 at an end of which a floating-type optical head 207 is disposed. A voice coil motor 208 for rotating the arm is disposed at the end portion of the arm 202 opposite to the media via the revolving shaft of the arm 202. The voice coil motor 208 comprises: a coil 209 disposed at the end of the arm 202; a magnet 210 disposed at a location opposed to the coil 209; and a yoke 211 forming a magnetic path.

Reference numeral 212 is a substrate on which driving means such as a spindle motor (not shown), a circuit such as a controlling circuit (not shown), the voice coil motor 208, and other component elements are disposed. The voice coil motor 208 is fixed to the substrate 212 via a fixing element 213.

The floating-type optical head comprises a floating slider and an optical device wherein the optical device comprises: means including at least a light source and means for condensing a light beam emitted by the light source; and photosensor means. The optical device is supported in such a manner that the optical device can move relative to the floating slider. Furthermore, there is also provided means for precisely moving at least either the optical device or the floating slider thereby performing at least either tracking control or focusing control. More specifically, a head having a similar structure to those described in the first through fifth embodiments may be employed in this embodiment.

As described above, according to the first aspect of the present invention, almost all component elements of an optical head, such as a light emitting device, photosensors, optical elements, etc., are formed in an integral fashion, whereby the size of the optical head can be reduced. Furthermore, it becomes possible to mold these elements in the form of one body, which allows a reduction of cost. Machining accuracy as well as assembling accuracy can be improved, and higher recording density can be achieved.

A floating slider and an optical head are isolated from each other, and the optical head is supported by the floating slider via a supporting element in such a fashion that the optical head opposes an optical recording medium, so that the optical head can be moved precisely in the focusing directions or tracking directions. Even if the plane vibration of an optical recording medium occurs, the distance between the optical head and the optical recording medium is maintained nearly constant. As a result, only the focusing error arising from machining inaccuracy of the optical head or from a variation in wavelength of the light emitted by the light emitting device should be corrected, wherein the correction can be done by moving the optical head so that the focusing is correctly controlled. In this way, the focusing-mechanism driving means is simplified and its size can be easily reduced.

According to the second aspect of the present invention, an optical recording medium is rotated at a high speed using a spindle motor. A floating-type optical head according to the first aspect of the present invention is pressed by a supporting element toward the optical recording medium so that the floating-type optical head floats over the optical recording medium. The floating-type optical head is moved using a tracking actuator in radial directions of the optical recording medium. An optical head is displaced by focusing-mechanism driving means such that the focusing is correctly controlled. With this arrangement, it becomes unnecessary to introduce a light beam from a light emitting device to the optical head or from the optical head to a photosensor. Furthermore, there is provided fine tracking-mechanism driving means for precisely displacing the optical head or the floating slider so that the tracking is correctly controlled. With this arrangement, it becomes possible to install the focusing-mechanism driving means and the fine tracking-mechanism driving means in the floating-type optical head. This allows a reduction in its size, and a high recording density as well as a high track density is achieved. Thus, a smaller size of an optical recording and reproducing apparatus is realized, and the recording density of the apparatus is improved.

Thus, the present invention can provide a small-sized recording and reproducing apparatus that can be installed in a portable personal computer such as a notebook-size personal computer. It is also possible to realize an optical recording and reproducing apparatus having a plurality of optical recording media that are stacked and fixed to a spindle motor. This means that the present invention can also provide a small-sized high-density recording and reproducing apparatus that can replace a magnetic recording and reproducing apparatus.

What is claimed is:

1. A floating-type optical head comprising:
   a floating slider for floating over a medium as a result of an air flow generated on the recording surface of the medium;
   an optical device comprising a light source, a light condensing means for condensing a light beam emitted by said light source onto said medium, and photo-detecting means for detecting a light beam reflected by the medium; and
   a support means to which said optical device is attached, said support means elastically supporting said optical device relative to said floating slider such that said optical device is movable in at least a substantially perpendicular direction relative to the recording surface of said recording medium, wherein said device floats together with said floating slider over said recording medium.

2. A floating-type optical head according to claim 1, wherein said floating slider has a through-hole formed in its center and said support means supports said optical device movably in said through-hole.

3. A floating-type optical head according to claim 1, wherein said support means comprises an elastic element connecting said floating slider and said optical device.

* * * * *